United States Patent
Gao et al.

(10) Patent No.: US 11,754,668 B2
(45) Date of Patent: Sep. 12, 2023

(54) DETECTION METHOD, DETECTION APPARATUS, AND SYSTEM

(71) Applicant: Huawei Technologies Co., Ltd., Shenzhen (CN)

(72) Inventors: Lutao Gao, Beijing (CN); Sha Ma, Beijing (CN); Sida Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/225,507

(22) Filed: Apr. 8, 2021

(65) Prior Publication Data

US 2021/0255275 A1    Aug. 19, 2021

Related U.S. Application Data

(63) Continuation of application No. PCT/CN2019/108443, filed on Sep. 27, 2019.

(30) Foreign Application Priority Data

Oct. 25, 2018    (CN) .......................... 201811253407.X

(51) Int. Cl.
*G01S 7/02* (2006.01)
*G01S 13/931* (2020.01)
*H04W 72/0453* (2023.01)

(52) U.S. Cl.
CPC .......... *G01S 7/0232* (2021.05); *G01S 13/931* (2013.01); *H04W 72/0453* (2013.01)

(58) Field of Classification Search
CPC .... G01S 7/0232; G01S 13/931; G01S 7/0235; G01S 13/38; G01S 13/343; G01S 13/345; G01S 13/584; G01S 13/347; G01S 2013/9316; G01S 13/42; G01S 7/36; H04W 72/0453

See application file for complete search history.

(56) References Cited

U.S. PATENT DOCUMENTS

| | | | |
|---|---|---|---|
| 5,920,279 A | * | 7/1999 | Andersson .............. G01S 13/87 342/198 |
| 2006/0181448 A1 | | 8/2006 | Natsume et al. |
| 2006/0244654 A1 | | 11/2006 | Cheng et al. |

(Continued)

FOREIGN PATENT DOCUMENTS

| CN | 103576143 A | 2/2014 |
|---|---|---|
| CN | 103823217 A | 5/2014 |

(Continued)

*Primary Examiner* — Olumide Ajibade Akonai
(74) *Attorney, Agent, or Firm* — Conley Rose, P.C.

(57) ABSTRACT

A detection method includes determining a first frequency point of N frequency points, transmitting a radio signal in a first frequency band in N frequency bands. One of the N frequency bands partially overlaps at least one frequency band in other N−1 frequency bands, and an absolute value of a difference between lowest frequencies of any two frequency bands of the N frequency bands is not less than a first threshold (F), or the N frequency bands have at least one second frequency band that partially overlaps the first frequency band, and an absolute value of a difference between a lowest frequency of each second frequency band and a lowest frequency of the first frequency band is not less than F.

21 Claims, 11 Drawing Sheets

(56) References Cited

U.S. PATENT DOCUMENTS

| | | | |
|---|---|---|---|
| 2007/0120731 A1 | 5/2007 | Kelly et al. | |
| 2011/0254724 A1* | 10/2011 | Ricci | G01S 7/0232 |
| | | | 342/28 |
| 2012/0169523 A1 | 7/2012 | Lee et al. | |
| 2014/0035774 A1 | 2/2014 | Khlifi | |
| 2014/0049268 A1* | 2/2014 | Ramrajkar | G01M 5/0025 |
| | | | 324/637 |
| 2015/0153449 A1* | 6/2015 | Kosowsky | G01S 13/89 |
| | | | 342/385 |
| 2015/0168546 A1* | 6/2015 | Nakagawa | G01S 7/282 |
| | | | 342/21 |
| 2015/0364830 A1* | 12/2015 | Tong | H01L 24/20 |
| | | | 342/27 |
| 2016/0061935 A1 | 3/2016 | Mccloskey et al. | |
| 2017/0176594 A1* | 6/2017 | Ichikawa | G01S 7/52004 |
| 2017/0293016 A1 | 10/2017 | Mccloskey et al. | |
| 2018/0149735 A1 | 5/2018 | Lim et al. | |
| 2018/0356507 A1 | 12/2018 | Ichinose et al. | |
| 2019/0056476 A1* | 2/2019 | Lin | G01S 13/931 |
| 2019/0097932 A1* | 3/2019 | Buczek | H04L 69/14 |
| 2019/0101617 A1 | 4/2019 | Kishigami et al. | |

FOREIGN PATENT DOCUMENTS

| | | |
|---|---|---|
| CN | 103913742 A | 7/2014 |
| CN | 103983953 A | 8/2014 |
| CN | 104378737 A | 2/2015 |
| CN | 105137422 A | 12/2015 |
| CN | 105891792 A | 8/2016 |
| CN | 108120958 A | 6/2018 |
| CN | 108700654 A | 10/2018 |
| DE | 102017100780 A1 | 7/2018 |
| JP | 2008298736 A | 12/2008 |
| JP | 2017529525 A | 10/2017 |
| KR | 20120000322 A | 1/2012 |
| KR | 101135982 B1 | 4/2012 |

* cited by examiner

DETECTION METHOD, DETECTION APPARATUS, AND SYSTEM

CROSS-REFERENCE TO RELATED APPLICATIONS

This application is a continuation of International Patent Application No. PCT/CN2019/108443 filed on Sep. 27, 2019, which claims priority to Chinese Patent Application No. 201811253407.X filed on Oct. 25, 2018. The disclosures of the aforementioned applications are hereby incorporated by reference in their entireties.

TECHNICAL FIELD

This application relates to the field of wireless communications, and in particular, to a method and an apparatus for detecting a target object by using a radio signal.

BACKGROUND

With development of society, more machines in modern life are developing towards automation and intelligence. Vehicles used for mobile travel are no exception. Smart vehicles are gradually entering people's daily life. In recent years, an advanced driving assistance system (ADAS) plays an important role in a smart vehicle. The system uses various sensors installed on the vehicle to sense a surrounding environment, collect data, and identify, detect, and track static and moving objects, and combined with map data of a navigator, the system performs systematic calculation and analysis, so that a driver can be aware of a potential danger in advance. This effectively improves comfort and safety of vehicle driving.

In an unmanned driving architecture, a sensing layer includes a visual system sensor such as a vehicle-mounted camera and a radar system sensor such as a vehicle-mounted millimeter wave radar, a vehicle-mounted laser radar, or a vehicle-mounted ultrasonic radar. A millimeter-wave radar is the first to become a main sensor of an unmanned driving system because of low costs and a mature technology. There are more than 10 functions have been developed for the ADAS, including adaptive cruise control (ACC), autonomous emergency braking (AEB), lane change assist (LCA), and blind spot monitoring (BSD). These functions are inseparable from the vehicle-mounted millimeter wave radar. A millimeter wave is an electromagnetic wave with a wavelength ranging from 1 millimeter (mm) to 10 mm, and a frequency range corresponding to the millimeter wave is 30 gigahertz (GHz) to 300 GHz. In this frequency band, features related to the millimeter wave are well-suited for the vehicle-mounted field. For example, a large bandwidth, rich frequency domain resources, and a low antenna side lobe help implement imaging or quasi-imaging, a short wavelength helps reduce a size of a radar device and an aperture of an antenna, and reduce a weight of the radar device, a narrow beam means that for a same antenna size, a beam of the millimeter wave is much narrower than that of a microwave, so that radar resolution is high, and penetration of the millimeter wave is high, and compared with a laser radar and an optical system, the millimeter wave is more capable of penetrating smoke, dust, and fog, and can perform all-weather working.

With wide use of vehicle-mounted radars, mutual interference between vehicles in which vehicle-mounted radars are located becomes more serious. The mutual interference reduces a detection probability of the vehicle-mounted radar or improves a false alarm (ghost) probability of the vehicle-mounted radar. Therefore, the mutual interference obviously affects driving safety or comfort of vehicles. Under this premise, how to reduce interference between vehicle-mounted radars is a technical problem that needs to be urgently resolved.

SUMMARY

This specification describes a detection method, a detection apparatus, and a system, to reduce interference between detection apparatuses.

According to one aspect, an embodiment of this application provides a method for detecting a target object by using a radio signal. The method is applied to a detection apparatus, for example, a radar. The method includes determining a first frequency band, where the first frequency band is one of N frequency bands, and transmitting the radio signal in the first frequency band. Further, the radio signal is reflected by the target object to form a reflected signal, and the reflected signal is received by the detection apparatus. The detection apparatus determines information about the target object by using the radio signal and the reflected signal. The information about the target object may include at least one piece of position information, speed information, and angle information.

In a possible design, any one of the N frequency bands partially overlaps at least one frequency band of the other N−1 frequency bands, and an absolute value of a difference between lowest frequencies of any two frequency bands of the N frequency bands is not less than a first threshold F. This design can avoid waste of frequency domain resources caused by completely separating frequency sweep bands of a plurality of radars in frequency domain, can effectively use frequency resources, achieve relatively high anti-interference performance with relatively low frequency resource cost, and can support communication of a larger quantity of radars.

Further optionally, an absolute value of a difference between a lowest frequency of any one of the N frequency bands other than the first frequency band and a lowest frequency of the first frequency band is a positive integer multiple of the first threshold F. This design is especially suitable for a plurality of radars with same attributes or of a same type.

In a possible design, the N frequency bands have at least one second frequency band that partially overlaps the first frequency band, an absolute value of a difference between a lowest frequency of each second frequency band and a lowest frequency of the first frequency band is not less than a first threshold F, and the first threshold F is a parameter corresponding to the first frequency band.

Further optionally, the N frequency bands have at least one third frequency band, and an absolute value of a difference between a lowest frequency of each third frequency band and the lowest frequency of the first frequency band is not a positive integer multiple of the first threshold F. In this design, a frequency sweep band for one or more other types of radars may also be provided, and when there are a plurality of types of radars, a frequency band is set more comprehensively, and compatibility is stronger.

In a possible design, a bandwidth of the first frequency band is a frequency sweep bandwidth of the radio signal.

In a possible design, a transmission cycle of the radio signal is T, and transmitting the radio signal in the first frequency band includes transmitting the radio signal in the first frequency band in a current transmission cycle.

In a possible design, the N frequency bands are used to provide a candidate frequency band on which switching can be performed during interference avoidance. For example, in a previous transmission cycle of the current transmission cycle, a frequency band used to transmit the radio signal is a fourth frequency band, where the fourth frequency band is a frequency band other than the first frequency band of the N frequency bands. Alternatively, in a next transmission period of the current transmission period, a frequency band used to transmit the radio signal is a fourth frequency band, where the fourth frequency band is a frequency band other than the first frequency band of the N frequency bands, and an absolute value of a difference between a lowest frequency of the fourth frequency band and the lowest frequency of the first frequency band is a positive integer multiple of the first threshold.

In a possible design, the first threshold F is greater than or equal to a frequency change range F1 of the radio signal in a first time length T1, and a value of the first time length T1 satisfies one of the following:

$T1=T2$, $T1=M*T2$, $T1=T2+T4$, $T1=\max(T2,T4)$, $T1=T2+T3$, $T1=M*T2+T3$, $T1=T2+T3+T4$, and $T1=\max(T2,T4)+T3$, where $T2=2*d_{max}/c$, $d_{max}$ is a maximum detection distance, T3 is a transmit timing moment error, $T4=\mathrm{dif}_{max}/c$, $\mathrm{dif}_{max}$ is a maximum interference tolerance distance, c is a speed of light, and M is an integer greater than or equal to 2.

There is a plurality of optional implementations in the possible design. A specific implementation may be related to a capability of the detection apparatus, for example, whether positive and negative intermediate frequencies and a delay caused by the maximum detection distance can be distinguished, or may be related to another delay that causes relatively large interference, for example, an interference maximum tolerance distance, a transmit timing moment error, and the like. In an actual design, a threshold may be configured based on a specific situation, or there may be a predefined or configured threshold for the detection apparatus to use a frequency band obtained based on the threshold, or a plurality of frequency bands that meet the foregoing limitation are directly defined or configured for the detection apparatus to use. This is not limited herein.

In a possible design, the first threshold F is greater than the frequency change range F1 in the first time length T1, F and F1 satisfy: $F=F1+\Delta$, and $\Delta$ is a predefined or configured constant. This design manner is to avoid interference caused by some possible errors.

In a possible design, an initial transmission moment of the radio signal is determined as a first moment, where the first moment is one of P candidate initial moments, and P is a positive integer.

Further optionally, the P candidate initial moments are distributed at an equal interval in time domain, and a time interval between any two candidate initial moments is a positive integer multiple of a third threshold. Further, the third threshold is T2, $T2=2*d_{max}/c$, $d_{max}$ is the maximum detection distance, and c is the speed of light.

In this possible design, a plurality of candidate initial moments is provided in time domain. A principle of providing the plurality of candidate initial moments is similar to that of setting of the N frequency bands, to effectively use a time domain/frequency domain resource, and support communication of a larger quantity of radars on a premise that interference can be reduced or avoided.

According to another aspect, an embodiment of this application provides a detection apparatus, where the apparatus includes a determining unit, configured to determine a first frequency band, where the first frequency band is one of N frequency bands, and a transmission unit, configured to transmit the radio signal in the first frequency band. Further, the radio signal is reflected by the target object to form a reflected signal, and the reflected signal is received by a receiving unit of the detection apparatus. The determining unit determines information about the target object by using the radio signal and the reflected signal. The information about the target object may include at least one piece of position information, speed information, and angle information.

In a possible design, any one of the N frequency bands partially overlaps at least one frequency band of the other N−1 frequency bands, and an absolute value of a difference between lowest frequencies of any two frequency bands of the N frequency bands is not less than a first threshold F.

In a possible design, the N frequency bands have at least one second frequency band that partially overlaps the first frequency band, an absolute value of a difference between a lowest frequency of each second frequency band and a lowest frequency of the first frequency band is not less than a first threshold F, the first threshold F is a parameter corresponding to the first frequency band, and N is a positive integer.

According to a third aspect, an embodiment of this application provides a detector, including a processor and a transmit antenna, where the processor is configured to determine a first frequency band, and the first frequency band is one of N frequency bands, and the transmit antenna is configured to transmit the radio signal in the first frequency band. Further, the radio signal is reflected by a target object to form a reflected signal, and the reflected signal is received by a receive antenna of the detector. The processor determines information about the target object by using the radio signal and the reflected signal. The information about the target object may include at least one piece of position information, speed information, and angle information. The transmit antenna and the receive antenna may be independently disposed, or may be integrated and disposed as a transceiver antenna.

In an optional design, any one of the N frequency bands partially overlaps at least one frequency band of the other N−1 frequency bands, and an absolute value of a difference between lowest frequencies of any two frequency bands of the N frequency bands is not less than a first threshold F.

In an optional design, the N frequency bands have at least one second frequency band that partially overlaps the first frequency band, an absolute value of a difference between a lowest frequency of each second frequency band and a lowest frequency of the first frequency band is not less than a first threshold F, and the first threshold F is a parameter corresponding to the first frequency band.

According to a fourth aspect, this application provides a detection apparatus, where the detection apparatus includes a processor and a memory, the memory stores a computer program, and when executing the computer program, the processor implements the method in any one of the first aspect and the possible implementations of the first aspect.

According to a fifth aspect, this application provides a computer storage medium that stores a computer program, where the computer program is stored in the computer storage medium, and when the computer program is executed by a processor (or a detector, a radar, a detection apparatus, or the like), the processor implements the method in any one of the first aspect and the possible implementations of the first aspect.

According to a sixth aspect, this application provides a computer program product, where the computer program product includes computer program code, and when the computer program code is run by a communications unit, a processing unit, a transceiver antenna, or a processor of a detection apparatus (a detector or a radar), the detection apparatus performs the method in any one of the first aspect and the possible implementations of the first aspect.

According to a seventh aspect, this application provides a chip, where the chip includes a processor, configured to support a detection apparatus to implement functions in the foregoing aspects, for example, generating or processing data and/or information in the foregoing methods. In a possible design, the chip further includes a memory, and the memory is configured to store a program instruction and data that are necessary for the detection apparatus.

According to an eighth aspect, this application provides a chip, where the chip includes a processing module and a communications interface, the processing module is configured to control the communications interface to communicate with outside, and the processing module is further configured to implement the method in any one of the first aspect and the possible implementations of the first aspect.

Compared with the other approaches, solutions provided in this application may support as many detection apparatuses as possible for communication on limited resources, and avoid or reduce interference between the detection apparatuses.

BRIEF DESCRIPTION OF DRAWINGS

The following describes in more details the embodiments of this application with reference to accompanying drawings.

DESCRIPTION OF EMBODIMENTS

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

In the embodiments of this application, "a plurality of" refers to two or more than two. The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects.

Figure 1:
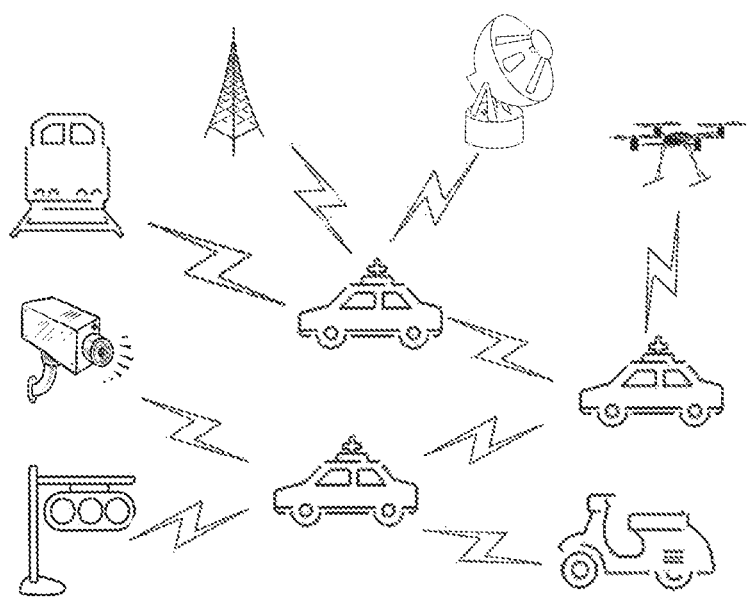
FIG. 1 is a schematic diagram of a possible application scenario according to an embodiment of this application.

FIG. 1 is a schematic diagram of a possible application scenario according to an embodiment of this application. A communications system in this application scenario includes one or more radar apparatuses, and a target apparatus that interacts with the radar apparatus. The radar apparatuses may communicate with each other by using one or more air interface technologies. This application is mainly applied to a vehicle-mounted radar system. This application may also be applied to another radar system, provided that interaction between radars exists in the system.

As shown in FIG. 1, a radar may be installed on a motor vehicle, an unmanned aerial vehicle, a track car, a bicycle, a signal light, a speed measurement apparatus, a network device (such as a base station or a terminal device in various systems), or the like. This application is applicable to a radar system between vehicles, a radar system between a vehicle and another apparatus such as the unmanned aerial vehicle, or a radar system between other apparatuses. A position for installing the radar and a function of the radar are not limited in this application.

The following explains terms that may appear in the embodiments of this application.

Radar: The radar is also referred to as a radar device, a detector, or a detection apparatus. A working principle of the radar is to transmit a signal (or as a detection signal) and receive a reflected signal reflected by a target object, to detect a corresponding target object.

Initial frequency: At beginning of a transmission cycle, the radar transmits a radar signal at an initial frequency, and a transmission frequency changes in the transmission cycle based on the initial frequency.

Available bandwidth: A frequency domain range that the radar signal is allowed to transmit. Usually, the available bandwidth needs to comply with a law and a regulation.

Frequency sweep bandwidth: A bandwidth occupied by a radar signal waveform. Here, it should be noted that the "frequency sweep bandwidth" is defined for ease of description, and is technically a bandwidth occupied by the radar signal waveform. Further, a frequency band occupied by the radar signal waveform may be referred to as a frequency sweep band. The transmission cycle of the radar signal is also referred to as frequency sweep time, namely, time for transmitting a complete waveform.

Frequency-modulated continuous wave: An electromagnetic wave whose frequency varies with time.

Linear frequency-modulated continuous wave: An electromagnetic wave whose frequency changes linearly with time. The linear change herein usually refers to a linear change in a cycle. Further, a waveform of the linear frequency-modulated continuous wave is usually a sawtooth wave or a triangular wave, and there may be another possible waveform, for example, a pulse.

Noise power: Noise power of a radar receiver. For a specific meaning, reference may be made to the other approaches in this field. "Caused interference" mentioned in the embodiments of this application usually means that power of an interference signal is greater than or equal to the noise power.

Maximum ranging distance: The maximum ranging distance is also referred to as a maximum detection distance, and is a parameter related to radar configuration (factory setting parameter or related to the factory setting parameter). For example, a maximum ranging distance of a long-distance ACC radar is 250 meters (m), and a maximum ranging distance of a medium-distance radar is 70 m to 100 m. If the maximum ranging distance is 250 m, a specific application scenario does not have a high requirement on radar distance resolution. Optionally, the distance resolution is related to the frequency sweep bandwidth.

Interference maximum tolerance distance: The interference maximum tolerance distance is also referred to as a maximum interference tolerance distance. A signal sent by a radar whose distance to a current radar is the interference maximum tolerance distance interferes with the current radar. Further, another radar signal is received by the current radar after a specific transmission delay. After the transmission delay, if power of an interference signal is not less than noise power, the interference signal causes interference to the current radar. If the power of the interference signal is less than the noise power, the interference signal does not cause interference to the current radar, and the interference signal is processed as noise. Therefore, after the transmission delay, if the power of the interference signal is equal to the noise power, a distance between a transmit end radar of the interference signal and the current radar is referred to as the interference maximum tolerance distance. It may also be understood as a distance corresponding to a spatial propagation delay required by a plurality of radars to receive a signal from each other. For the interference maximum tolerance distance, it should be noted that there is another possibility. The interference maximum tolerance distance may be a maximum distance when a lane keeps a straight line (a vehicle may keep a straight line in the lane without changing a driving direction, and the straight line herein is not a straight line in a strict sense, and is subject to a specific design of a road, for example, that the straight line does not directly change to a lane on which a turn or a U-turn is performed, or a direction of a lane is not changed because there is no obstacle in the front of the lane). A person skilled in the art may know that only when a radar signal of a front vehicle is received by a radar receiver of a rear vehicle, interference may be caused to the radar of the rear vehicle. Assuming that power of a transmitted signal of another radar at a distance of 2000 m is considered as noise power when the transmitted signal reaches the current radar after the transmission delay, 2000 m can be referred to as the maximum interference tolerance distance. However, if a straight-line distance of the road on which the radar is located is less than 2000 m, for example, turning or other changes occur at 1000 m, a vehicle beyond 1000 m does not cause interference to the current radar (in other words, there is no vehicle beyond 1000 m in a current straight-line driving direction). Therefore, based on a specific implementation, a maximum value of two distances may be used as the interference maximum tolerance distance, or one of the two distances may be defined as the interference maximum tolerance distance based on a specific application or scenario, which depends on a final implementation.

Signal transmission error: The signal transmission error is also referred to as a transmit timing moment error. When a plurality of radars need to transmit signals at the same time, there may be a timing transmission error. It may be understood that the plurality of radars transmit a plurality of radar signals at the same time. However, due to a possible difference in an actual communication scenario, environment, or hardware device, there is an error at an actual sending moment, which is referred to as the signal transmission error, for example, an error caused by precision of a Global Positioning System (GPS).

Intermediate frequency (IF) signal: A signal obtained after a radar local oscillator signal and a received target reflected signal are processed by a frequency mixer is the intermediate frequency signal. Further, a part of a frequency-modulated continuous wave signal generated by an oscillator is used as a local oscillator signal, and a part of the frequency-modulated continuous wave signal is used as a transmitted signal and transmitted by using a transmit antenna. A reflected signal of the transmitted signal received by a receive antenna is mixed with the local oscillator signal, to obtain the "intermediate-frequency signal". At least one piece of position information, speed information, and angle information of the target object may be obtained by using the intermediate frequency signal. The position information, the speed information, and the angle information may be relative position, relative speed, and relative angle information relative to a current radar. Further, a frequency of the intermediate frequency signal is an intermediate frequency.

Figure 2:
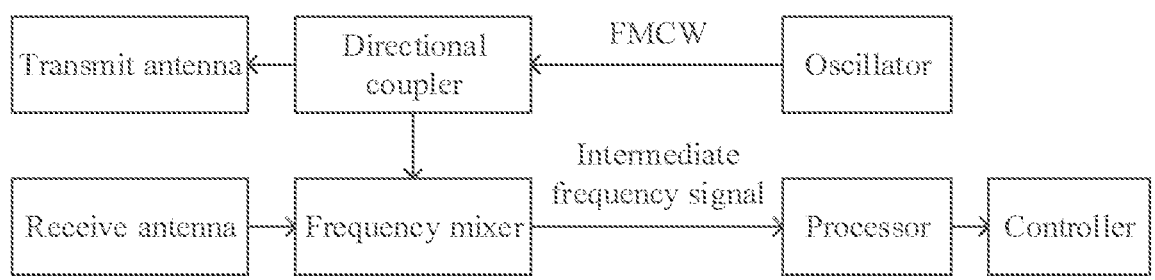
FIG. 2 is a schematic diagram of a structure of a radar apparatus.

With reference to FIG. 2, the following describes a processing and transmission process of a radar signal by using a reference architecture of a vehicle-mounted millimeter wave radar apparatus. FIG. 2 is a schematic diagram of an example structure of a vehicle-mounted millimeter wave radar apparatus. The vehicle-mounted millimeter wave radar apparatus usually includes apparatuses such as an oscillator, a transmit antenna, a receive antenna, a frequency mixer, and a processor. A controller in FIG. 2 is usually not included in the vehicle-mounted millimeter wave radar apparatus, but includes a receive end of a signal output by the vehicle-mounted millimeter wave radar apparatus. For example, the controller may be located in a vehicle, or may be a processing apparatus configured to control driving of the vehicle. This is not limited in this embodiment of this application. The oscillator generates a signal whose frequency increases linearly with time. The signal may be referred to as a linear frequency-modulated continuous wave (LFMCW). A part of the frequency-modulated continuous wave is output to the frequency mixer as a local oscillator signal through a directional coupler, a part is transmitted by using the transmit antenna, a signal reflected by an object in front of the vehicle is received by using the receive antenna, and the signal is mixed with the local oscillator signal to obtain the intermediate frequency signal. The intermediate-frequency signal includes information about a target object, the information about the target object may be a relative parameter between the target object and the vehicle in which the vehicle-mounted radar is located, for example, at least one piece of information of a relative distance, speed, or angle between the target object and the vehicle. The intermediate frequency signal (for example, an intermediate frequency signal that passes through a low-pass filter and is amplified, where the low-pass filter is not shown in the figure) is transmitted to the processor, and the processor processes the intermediate frequency signal (for example, may perform fast Fourier transformation or spectrum analysis on the signal) to obtain the information about the target object, and finally outputs the information to the controller to control the vehicle. Usually, based on configuration of the radar, an intermediate frequency corresponding to the maximum ranging distance is considered as a maximum intermediate frequency. A signal whose frequency is greater than the intermediate frequency is filtered out by the low-pass filter.

The following uses a sawtooth wave as an example to describe a ranging principle of the millimeter wave radar. A ranging principle of a triangular wave is similar to that of the sawtooth wave.

Figure 3:
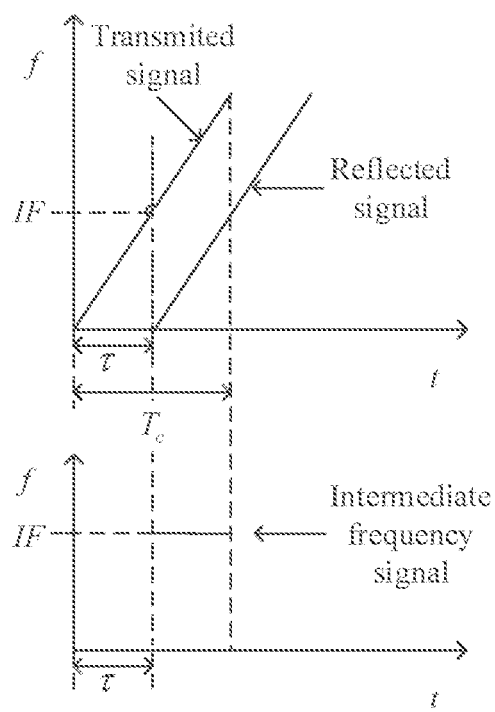
FIG. 3 is a schematic diagram of possible frequency changes of a transmitted signal, a reflected signal, and an intermediate frequency signal.

The millimeter wave radar transmits a series of signals by using the transmit antenna. When the signals encounter an obstacle, the signals are reflected back. A shape of a transmitted signal is the same as that of a reflected signal. FIG. 3 is a schematic diagram of possible frequency changes of a transmitted signal, a reflected signal, and an intermediate frequency signal. As shown in FIG. 3, the transmitted signal and the received signal are represented as:

$$x_1 = \sin(\omega_1(t) \cdot t + \varphi_1)$$

$$x_2 = \sin(\omega_2(t) \cdot t + \varphi_2),$$

where $\omega_1(t)$ and $\omega_2(t)$ respectively are angular velocities of the transmitted signals $x_1$ and $x_2$, and $\varphi_1$ and $\varphi_2$ respectively are initial phases of the transmitted signals $x_1$ and $x_2$. There is a delay $\tau$ between the transmitted signal and the received signal in terms of time. As shown in FIG. 3, a relationship between $\tau$ and a target distance d may be represented as follows:

$$\tau = \frac{2d}{c},$$

where c is a speed of light.

The transmitted signal is multiplied by the received signal in a frequency mixer, and then an intermediate frequency (IF) signal is output after passing through a low-pass filter. A frequency of the intermediate frequency signal (IF frequency) is equal to a difference between a frequency of the transmitted signal and a frequency of the received signal, which is expressed as follows:

$$x_{out} = \sin[(\omega_1(t) - \omega_2(t)) \cdot t + (\varphi_1 - \varphi_2)].$$

As shown in FIG. 3, the intermediate frequency is a product of a transmitted signal slope s and a delay $\tau$, which may be represented as follows:

$$\text{IF} = s * \tau = \frac{F_{max}}{T_{max}} * \frac{2d}{c} = \frac{2d}{c * T_{max}} * F_{max}.$$

Therefore, the distance d from the target object to the intermediate frequency signal is calculated as follows:

$$d = \frac{c * T_{max}}{2 * F_{max}} * \text{IF}.$$

The transmitted signal slope is $$\frac{F_{max}}{T_{max}},$$

$F_{max}$ is a frequency sweep bandwidth of a radar signal, and for a sawtooth wave, $T_{max}$ is a transmission cycle. For a triangular wave, $T_{max}$ is half the transmission cycle. It may be understood that, $T_{max}$ is related to a waveform.

It can be learned from the foregoing derivation that there is a linear relationship between the frequency difference (namely, the intermediate frequency) between the transmitted signal and the received reflected signal and a delay. The farther the object is, the later the reflected signal is received, and the greater the frequency difference between the reflected signal and the transmitted signal. A distance between the signal and the obstacle can be determined based on the intermediate frequency signal frequency. In an actual application, a distance between the signal and the target object may also be calculated by using a phase difference between the transmitted signal and the received signal. In other words, the distance between the object and the radar may be obtained by detecting the intermediate frequency or a phase. It can be learned from the foregoing that information about the target object is also included in intermediate frequency information or phase information. The low-pass filter can tilter out signals whose frequencies are higher than a maximum intermediate frequency. Therefore, interference of these signals does not need to be considered. The maximum intermediate frequency is an intermediate frequency corresponding to the maximum ranging distance, or a frequency change range in a delay caused by the maximum ranging distance.

It should be noted that the transmitted signal slope reflects a degree to which a transmit frequency or a receive frequency changes with time. If the frequency of the transmitted signal decreases with time, the slope is a negative value, and if the frequency of the transmitted signal increases with time, the slope is a positive value. For the triangular wave, the slopes of a rising edge and a falling edge are opposite numbers. An absolute value of the slope may also be referred to as a change range of a frequency in a unit time. Meanings of two representation manners in this embodiment of this application are the same.

Figure 4A:
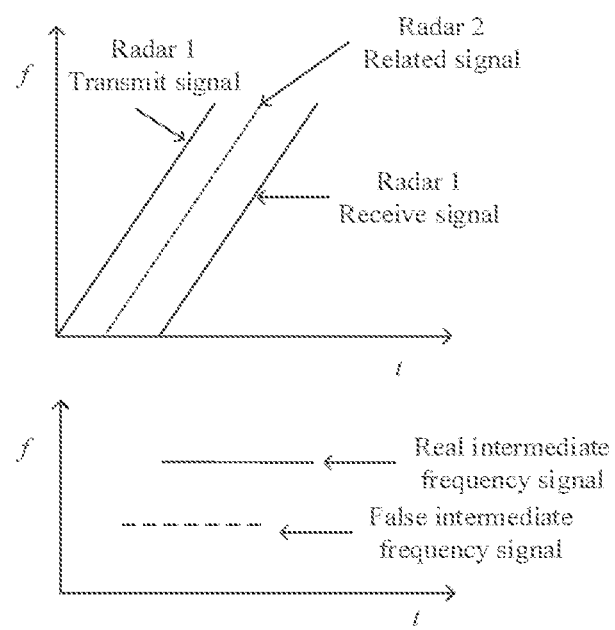
FIG. 4A and FIG. 4B provide schematic diagrams of a possible false intermediate frequency signal.
Figure 4B:
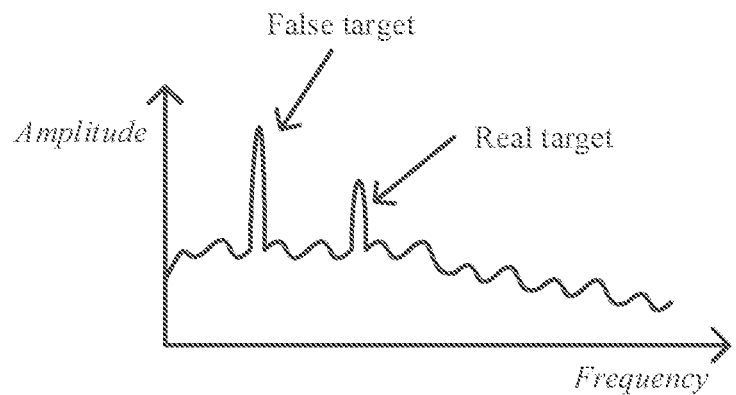

FIG. 4A and FIG. 4B provide schematic diagrams of a possible false intermediate frequency signal. Using FIG. 4A and FIG. 4B as an example, a radar 1 transmits a signal to a target object, and receives a signal from the target object. However, in a time range between transmitting the signal by the radar 1 and receiving the reflected signal by the radar 1, a receive antenna of the radar 1 receives a transmitted signal or a reflected signal of a radar 2 (dashed line). A signal waveform of the radar 1 is the same as that of the radar 2, and a frequency sweep bandwidth of the radar 1 is the same as that of the radar 2. In the time range in which the radar 1 transmits the signal but the reflected signal is not received, the radar 1 detects a dashed line signal of a corresponding frequency. In this case, the radar 1 considers that a "target object 1" exists. When the radar 1 starts to receive the reflected signal, the radar 1 detects the dashed line signal and a solid line reflected signal, and the radar 1 considers that the "target object 1" and a "target object 2" exist. In this case, the radar 1 may mistakenly consider the received dashed line signal as a reflected signal of an object that exists in front of the radar 1. In this case, a false intermediate frequency signal is generated, as shown in FIG. 4A. After fast Fourier transformation, two peak values may be found through spectrum analysis. As shown in FIG. 4B, each peak value corresponds to one target object. The radar 1 mistakenly considers that the "target object 1" exists in front of the radar 1, but actually the "target object 1" does not exist, and is also referred to as a "ghost" or a "false alarm". After the false alarm is generated, an automated driving vehicle slows down or suddenly brakes when there is no object in front of the vehicle, which reduces comfort and safety of driving.

It should be noted herein that, a person skilled in the art may know that a signal received at a moment or in a period of time may be an interference signal, or may be the reflected signal of the target object, and a radar detection status can be clearly reflected by using a related change status of time and a transmitted/received signal frequency. Therefore, in subsequent descriptions of this application, a curve diagram that reflects a slope (a frequency change range in a unit time) of a transmitted/received signal is mostly used to indicate mutual interference between radars.

Figure 5A:
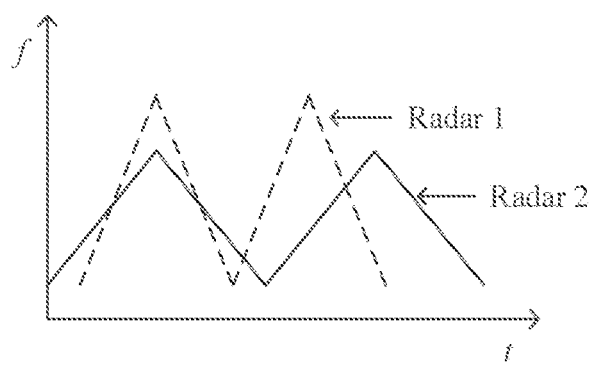
FIG. 5A is a schematic diagram of a possible solution.
Figure 5B:
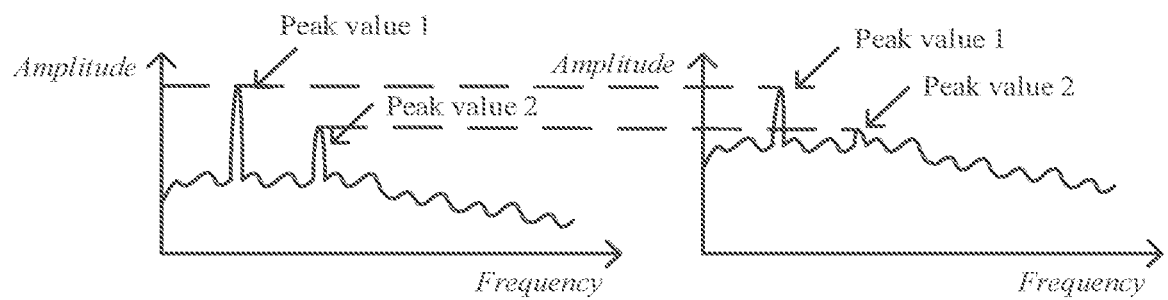
FIG. 5B is a schematic diagram of a possible false alarm result.

To resolve the foregoing problem, in a possible solution, different parameters such as a waveform slope and a period may be set for different radars. FIG. 5A is a schematic diagram of a possible solution. As shown in FIG. 5A, parameters such as a waveform slope and a period of the radar 1 are inconsistent with those of the radar 2. In this way, even if the radar 1 receives the signal of the radar 2, because waveforms of the radar 1 and the radar 2 are inconsistent, when the signal passes through the frequency mixer, in other words, when frequencies of the radar 1 and the radar 2 are different, an intermediate frequency signal with a constant frequency is not generated. Because only the intermediate frequency signal with the constant frequency is reflected as a peak signal in the spectrum analysis, this method can reduce a probability of occurrence of the ghost. However, if the radar 1 receives the signal from radar 2, the interference signal falls within a valid receive intermediate frequency bandwidth after passing through the frequency mixer, which increases strength of the interference signal. After an interference signal level is increased, an original target is submerged by interference, as shown in FIG. 5B. FIG. 5B is a schematic diagram of a possible false alarm result. A consequence is that an obstacle in front of the vehicle is not detected, and therefore a false alarm is generated. This causes a severe impact on driving safety of the vehicle, especially safety of an unmanned vehicle.

Figure 6A:
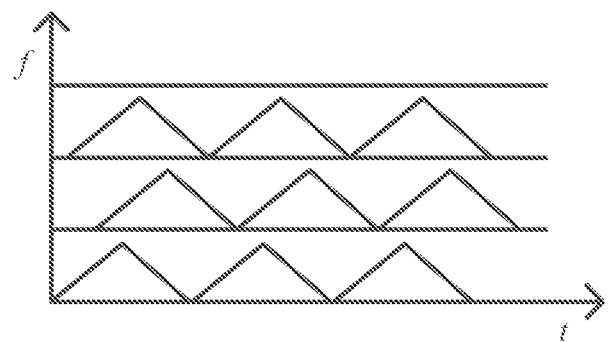
FIG. 6A is a schematic diagram of another possible solution.
Figure 6B:
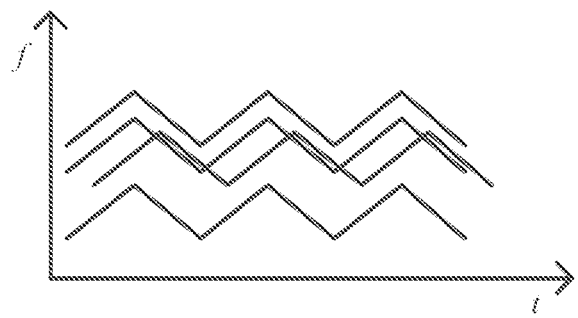
FIG. 6B is a schematic diagram of still another possible solution.

FIG. 6A is a schematic diagram of another possible solution. A technology used in this solution is a radar waveform frequency hopping technology. If the radar detects interference from other radars in a frequency sweep band of the radar, the radar jumps to another frequency sweep band to prevent interference between a plurality of radars. In the frequency hopping technology, a frequency hopping interval may be greater than the frequency sweep bandwidth of the radar, as shown in FIG. 6A. In this case, waveforms of radars are completely frequency-divided and do not overlap. However, a frequency hopping interval is set, so that too many frequency domain resources are occupied. Frequency domain resources allocated to a vehicle-mounted radar are limited. Alternatively, the frequency hopping technology is still used, but the radar performs random frequency hopping after detecting interference generated by another radar in an operating frequency band, as shown in FIG. 6B. FIG. 6B is a schematic diagram of still another possible solution. In this case, interference can be reduced to a certain extent. However, if frequency hopping is completely randomized, waveforms of two radars after the frequency hopping may be too close in frequency domain. As a result, the ghost occurs or interference signal strength increases, causing missing detection of an object.

It should be noted that, in this embodiment of this application, when a value is compared with a threshold, an absolute value of a difference is used, and a problem of positive or negative is not considered. The difference can distinguish positive from negative. For example, a difference involved in determining of a positive intermediate frequency and a negative intermediate frequency may be distinguished between positive and negative.

Therefore, the embodiments of this application provide a detection method, to resolve a problem of mutual interference between a plurality of radars by transmitting a radar signal in a frequency division manner, and improve frequency domain resource utilization efficiency. In the method, mutual interference may be avoided or mutual interference may be reduced between as many radars as possible in a same frequency domain resource.

Embodiment 1

Figure 7:
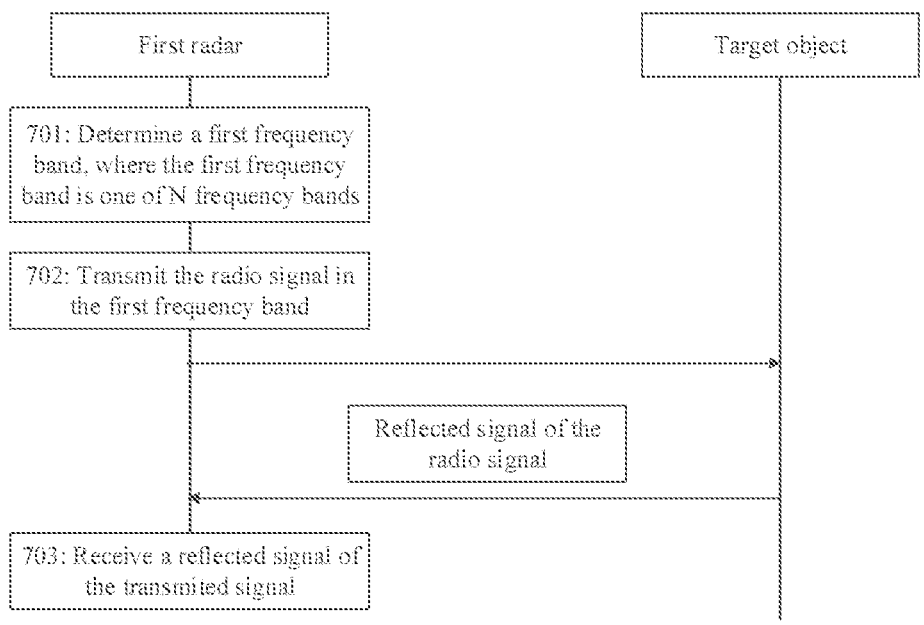
FIG. 7 is a schematic flowchart of a possible detection method.

FIG. 7 is a schematic flowchart of a possible detection method. The following describes, with reference to FIG. 7, an example of a detection method provided in an embodiment of this application. The method may be applied to a first apparatus. It should be noted that the first apparatus may be an apparatus that is independent of or integrated into a first radar (or referred to as a first detector or a first detection apparatus). For example, the first apparatus may be a group of chips that are independent of or integrated into the first radar. Alternatively, the first apparatus may be a group of modules or elements that are independent of or integrated into the first radar. Alternatively, the first apparatus may be a group of software modules, which are stored in a computer-readable storage apparatus. A signal transmission cycle of the first radar is T.

Step 701: Determine a first frequency band, where the first frequency band is one of N frequency bands.

A bandwidth of the first frequency band is a frequency sweep bandwidth of a radio signal transmitted by the first radar. The frequency sweep bandwidth of the radar in this application is understood as a frequency sweep bandwidth of a signal transmitted by the radar.

Further optionally, the first frequency band may be an initial frequency sweep band (namely, a first transmission cycle) of the radio signal, or may be a frequency sweep band in any transmission cycle. Further, for the first radar, the initial frequency sweep band and the frequency sweep band in any transmission period are one of the N frequency bands.

Further, when the radar is started, a frequency band may be randomly selected from the N frequency bands as the frequency sweep band of the first transmission period, or a frequency band may be selected from the N frequency bands according to a preset rule as the frequency sweep band of the first transmission period.

Further, in a transmission cycle, if the radar detects that no interference signal exists in one or more frequency bands of the N frequency bands, a signal may be transmitted in the transmission cycle or in a next transmission cycle by using one frequency band of the one or more frequency bands as the frequency sweep band. One frequency band in the one or more frequency bands may be randomly determined, or may be determined according to the preset rule, which is not limited herein.

In an optional design, the detection method may include step 700: Determine a first frequency, where the first frequency is a frequency of a first frequency point in N frequency points. The "frequency point" is a point or a position in frequency domain. Further, the first frequency and the frequency sweep bandwidth of the radio signal define the first frequency band. Further optionally, the first frequency may be a lowest frequency, a highest frequency, or a center frequency of the first frequency band, which is not limited herein. It should be noted herein that, based on the foregoing analysis, the first frequency band may be defined by using the first frequency point and the frequency sweep bandwidth. In this case, "determine a first frequency band" in the step 701 may be understood as "determine a first frequency point". In other words, the detection method provided in this embodiment of this application may include at least one of the step 700 and the step 701.

In an optional design, the N frequency bands or the N frequency points may be specified in a standard or a protocol, or may be specified in a law or a regulation. Alternatively, it may be pre-agreed or pre-defined. Before the radio signal is transmitted, the first apparatus may determine the first frequency band of the N frequency bands or the first frequency point of the N frequency points, to transmit the signal.

Step 702: Transmit the radio signal in the first frequency band.

Step 703: Receive a reflected signal of the radio signal. Further, the transmitted signal is the reflected signal that is of the radio signal and that is reflected by a target object. The detection apparatus determines information about the target object based on the transmitted signal and the reflected signal. The information about the target object may include at least one of piece position information, speed information, and angle information. For details, refer to the foregoing explanation.

In a first optional manner, any one of the N frequency bands partially overlaps at least one frequency band of the other N−1 frequency bands, and an absolute value of a difference between lowest frequencies of any two frequency bands of the N frequency bands is not less than a first threshold F. This design can avoid waste of frequency domain resources caused by completely separating frequency sweep bands of a plurality of radars in frequency domain, can effectively use frequency resources, and achieve relatively high anti-interference performance with relatively low frequency resource cost.

Further optionally, an absolute value of a difference between a lowest frequency of any one of the N frequency bands other than the first frequency band and a lowest frequency of the first frequency band is a positive integer multiple of the first threshold F. In other words, an absolute value of a frequency difference between any two of the N frequency points is a positive integer multiple of the first threshold F. In other words, the N frequency points are distributed at an equal interval in frequency domain, and an absolute value of a frequency difference between two adjacent frequency points in frequency domain is the first threshold F. The two adjacent frequency points mean that in frequency domain, there is no other frequency point located in the N frequency points between the two frequency points. For details about two adjacent frequency points of the N frequency points, refer to this section. Further, bandwidths of the N frequency bands are the same. It should be noted that, for the N frequency points, the absolute value of the frequency difference between two adjacent frequency points in frequency domain is less than the bandwidth of the first frequency band. Otherwise, complete frequency division in frequency domain is still caused, resulting in low frequency domain resource utilization.

This design is suitable for a plurality of radars with same attributes or of a same type. Optionally, the plurality of radars meets at least one of the following. Transmitted signals have a same frequency sweep bandwidth and a same transmission cycle, a same variation of frequencies of transmitted signals in a unit time (herein, "same" refers to same variation, same as positive or negative), and a same maximum ranging distance, and it may be considered that the plurality of radars have a same attribute or belong to a same type. In other words, it may be understood that the first threshold F is a threshold corresponding to the plurality of radars, or is a threshold determined based on one or more parameters or attributes corresponding to the plurality of radars, and there is a direct or indirect correspondence between the first threshold and the one or more parameters or attributes. The one or more parameters or attributes may include one or more of a bandwidth, a transmission cycle, a transmit frequency, a variation of the transmit frequency in a unit time, and the like of the first frequency band. This design manner can be used to set or define radars with the same attributes or types in a unified manner. The implementation is simple and an error rate is low. For example, if all radars have a same attribute or belong to a same type, the N frequency bands or frequency points are uniformly defined. For another example, for each type of radar, the N frequency bands or frequency points are separately defined.

In a possible design, the N frequency bands have at least one second frequency band that partially overlaps the first frequency band, an absolute value of a difference between a lowest frequency of each second frequency band and a lowest frequency of the first frequency band is not less than a first threshold F, and the first threshold F is a parameter corresponding to the first frequency band. That the two frequency bands partially overlap herein means that the two frequency bands overlap and do not completely overlap in frequency domain, and one frequency band cannot completely include the other frequency band. Further, there are Q frequency bands in the N frequency bands, and an absolute value of a difference between lowest frequencies of any two frequency bands of the Q frequency bands is an integer multiple of the first threshold F. Alternatively, Q frequency points in the N frequency points are distributed at an equal interval in frequency domain, an absolute value of a frequency difference between two adjacent frequency points of the Q frequency points in frequency domain is the first threshold F. The Q frequency bands include the first frequency band and at least one frequency band that partially overlaps the first frequency band. The correspondence described herein may be a direct or indirect correspondence between the first threshold and any parameter related to the first frequency band, and is not limited to a correspondence between the first threshold F and the first frequency band. For example, the first threshold is a parameter corresponding to a radar that can operate in the first frequency band, or may be a parameter corresponding to an attribute of the first frequency band, or may be a parameter corresponding to a type of a radar that can operate in the first frequency band, or the like. This is not limited herein. This design is intended for radars of a same type or a same attribute, to avoid a waste of frequency domain resources caused by completely separating a plurality of frequency sweep bands in frequency domain, so that frequency resources can be effectively used, and relatively high anti-interference performance can be achieved with a relatively low frequency resource cost. In addition, a frequency sweep band for one or more other types of radars may also be provided. It should be noted that a plurality of frequency bands defined for radars of the same type or attribute cannot be completely frequency-divided.

This design applies to radars with different attributes or types. For example, radars are divided into a plurality of groups based on attributes or types. This grouping is only a logical division. There may be no substantive grouping, and the grouping is only used to identify different types of radars. If there is only one type of radars, refer to the first optional manner. If there are a plurality of types of radars, the second optional manner needs to be introduced. For any type of radars in the second optional manner, refer to the description of the first optional manner.

Further optionally, the N frequency bands have at least one third frequency band, and an absolute value of a difference between a lowest frequency of each third frequency band and the lowest frequency of the first frequency band is not an integer multiple of the first threshold F. Further, a bandwidth of the third frequency band is different from a bandwidth of the first frequency band. The at least one second frequency band may include at least one of the Q frequency bands, and/or at least one of the at least one third frequency band.

For ease of description, herein, a radar whose first frequency band may be used as the frequency sweep band is referred to as a first type radar, and the third frequency band may be used for a second type radar. Optionally, at least one fourth frequency band may further exist in the N frequency bands, and the fourth frequency band may be used for a third type radar. A quantity of types of radars included in the N frequency bands is not limited in this embodiment of this application. However, processing for each type of radars is the same or similar. For details, refer to related content of the first type radar. Because the design manner is applicable to radars with the plurality of different attributes or types, during implementation of the design manner, the radar mentioned above determines a frequency sweep band in the N frequency bands in the first transmission cycle or a specific transmission cycle. It should be understood that is determined in frequency bands of the N frequency bands for the same type of radars, rather than in all the N frequency bands.

For ease of describing the embodiments, the following describes the optional design by using an example, and does not limit the protection scope. In this example, the N frequency bands include only frequency bands used for the first type radar and the second type radar.

In this example, there is at least one third frequency band in the N frequency bands, and the at least one third frequency band may be used for the second type radar. An absolute value of a difference between lowest frequencies of any two frequency bands in the at least one third frequency band is an integer multiple of a second threshold F', and F' is not equal to F. According to the explanation in the first optional manner, the first threshold F corresponds to the first type radar, and based on a same principle, the second threshold F' corresponds to the second type radar. For specific explanation and analysis, refer to the foregoing description. In this design manner, an available frequency band or an available frequency point that is applied to a plurality of types of radars may be preset or defined for use and reference of various types of radars, and there is no need to separately set or define an available frequency band or an available frequency point for each type of radars. For example, a plurality of frequency bands or frequencies may be uniformly defined in the standard for use by various types of radars.

It should be noted herein that for frequency bands having a same bandwidth, a magnitude relationship between highest frequencies of the frequency bands is the same as a magnitude relationship between lowest frequencies of the frequency bands. For case of description, in this embodiment of this application, the relationship between the lowest frequencies of the frequency bands and the first threshold F is described. However, a person skilled in the art may know that a relationship between the highest frequency and the first threshold F is also determined.

In an optional design, the transmission cycle of the radio signal is T, and the transmitting the radio signal in the first frequency band includes transmitting the radio signal in the first frequency band in a current transmission cycle.

Further optionally, the radio signal is transmitted in the first frequency band in two or more continuous transmission cycles. For example, if interference does not exist in the current first frequency band, for example, no interference signal is detected, or the detected interference signal is extremely weak and does not constitute substantive interference, the first apparatus may continue to use the first frequency band to transmitted signals in a plurality of subsequent continuous transmission cycles until interference is detected.

For example, in an $n^{th}$ cycle, if it is detected that interference exists in the first frequency band, the fourth frequency band is determined in an $(n+1)^{th}$ cycle, and the fourth frequency band is a frequency band that is in the N frequency bands and that is different from the first frequency band. An absolute value of a difference between a lowest frequency of the fourth frequency band and the lowest frequency of the first frequency band is a positive integer multiple of the first threshold.

For another example, in an $(n-1)^{th}$ cycle, if it is detected that interference exists in the fourth frequency band (a frequency sweep band in an $(n-1)^{th}$ cycle), the first frequency band is determined in the $n^{th}$ cycle, and the fourth frequency band is a frequency band that is in the N frequency bands and that is different from the first frequency band. An absolute value of a difference between a lowest frequency of the fourth frequency band and the lowest frequency of the first frequency band is a positive integer multiple of the first threshold.

In this way, the frequency sweep band can be switched after interference is detected, to improve detection efficiency.

In an optional design, the step 702 further includes transmitting the radio signal in the first frequency band by using the first frequency as an initial frequency.

In a first implementation, the first frequency is the lowest frequency of the first frequency band. Further, in the current transmission cycle, a transmission frequency of the radio signal linearly increases with time. The time-varying mentioned here is the shift (backward) over time. For example, a waveform of the radio signal is a sawtooth wave.

In a second implementation, the first frequency is the highest frequency of the first frequency band. Further, in the current transmission cycle, a transmission frequency of the radio signal linearly decreases with time. For example, a waveform of the radio signal is a sawtooth wave.

In a third implementation, the first frequency is the center frequency of the first frequency band.

In the foregoing several implementations, a waveform of the sawtooth wave is used as an example for description. The embodiments of this application may be further applied to another waveform, for example, a triangular wave. For any waveform or radio signal type, the foregoing transmission cycle is a transmission cycle of a complete waveform.

It should be noted that, in this embodiment of this application, the N frequency points may be N frequency hopping grid points (raster). In other words, a start frequency (or a start frequency in a transmission cycle) in which the radar works can only be selected from the N frequency hopping grid points. Different radars can use different hopping grid points as the initial transmit frequency to avoid interference. Frequencies of the N frequency points are candidate initial frequencies used to transmit the radar signal. In other words, the initial frequency in which the radar operates can only be selected from the N frequency points.

It can be learned from the foregoing description of this embodiment of this application that a same type of radars corresponds to a same first threshold, and the first threshold may be calculated in a plurality of manners. A plurality of types of radars may use a same calculation manner, or may use different calculation manners. A calculation manner may be determined based on an attribute of each type of radars or a specific application scenario. This is not limited herein. For ease of description, with reference to FIG. 9 to FIG. 14, the following lists possible calculation manners of the first threshold by using the first threshold corresponding to the first radar as an example. In this embodiment of this application, the first threshold is related to at least one of a first distance, a second distance, and a first error. The first distance is a maximum ranging distance $d_{max}$ of the first radar, the second distance is an interference maximum tolerance distance $dif_{max}$ and the first error is a signal transmission moment error. A speed of the radar signal is a speed of light c. Therefore, there is a linear relationship between a distance d and transmission time t of the radar signal, that is, t=d/c. The linear relationship is used as a reference for the following calculation method.

In this embodiment of this application, the first threshold F is greater than or equal to a frequency change range F1 of the radio signal in a first time length T1. During transmission of the radio signal, a frequency change range in a period of time is an absolute value of a difference between a frequency value at a start moment of the period of time and a frequency value at an end moment of the period of time. Positive and negative of the difference are not considered, and the positive and negative are related to a waveform change. When the radio signal is a linear frequency-modulated continuous wave, the transmit frequency of the radio signal changes linearly in time. Therefore, the frequency change of the linear frequency-modulated continuous wave in a unit time is the same in a transmission cycle. Further, the frequency change range F1 of the radio signal in the first time length T1 is a product of a transmitted signal slope and the time length T1, that is, $$F1 = \frac{\Delta F}{\Delta T} \cdot T1.$$

$\Delta F/\Delta T$ is a frequency change range of the linear frequency-modulated continuous wave signal in a unit time, and may also be referred to as a waveform slope or a transmitted signal slope (for the linear frequency-modulated continuous wave, $$\frac{F_{max}}{T_{max}}$$

is equal to $$\frac{\Delta F}{\Delta T}$$

Further, the first time length T1 satisfies one of the following:

$T1=T2$, $T1=T2+T3$.

$T1=T2+T4$, $T1=T2+T3+T4$.

$T1=\max(T2,T4)$, $T1=\max(T2,T4)+T3$, $T1=M*T2$, and $T1=M*,T2+T3$.

T2 is a delay corresponding to the maximum ranging distance, and a value of T2 is $2*d_{max}/c$. T3 is a transmit timing moment error. T4 is a delay corresponding to the interference maximum tolerance distance, a value of T4 is $dif_{max}/c$, and M is a positive number not less than 1, for example, M=2.

In a first implementation, the first threshold F is equal to the frequency change range F1.

In a second implementation, the first threshold F is greater than the frequency change range F1. Further, the first threshold F is not greater than the frequency sweep bandwidth of the radar.

Optionally, F and $F=F1+\Delta$, and $\Delta$ is a predefined or configured constant.

A person skilled in the art may know that, in a case, inaccuracy of the radar apparatus may cause a frequency error of the transmitted signal. For example, an error caused by a transmit frequency of 80 GHz is about 4 megahertz (MHz). In another case, a side lobe effect of the radar signal may also cause an error in signal transmission. In still another case, to ensure robustness of system running, an additional constant may be introduced. The constant is related to an attribute or a type of the radar, or may be predefined or preconfigured. This is not limited herein. In a specific communication scenario, there may be another possible signal transmission error. In this implementation, the constant Δ is a sum of frequency variations brought by one or more of all possible errors. By introducing the constant, detection of the radar signal can be more accurate, and a system can run more stably.

Figure 8:
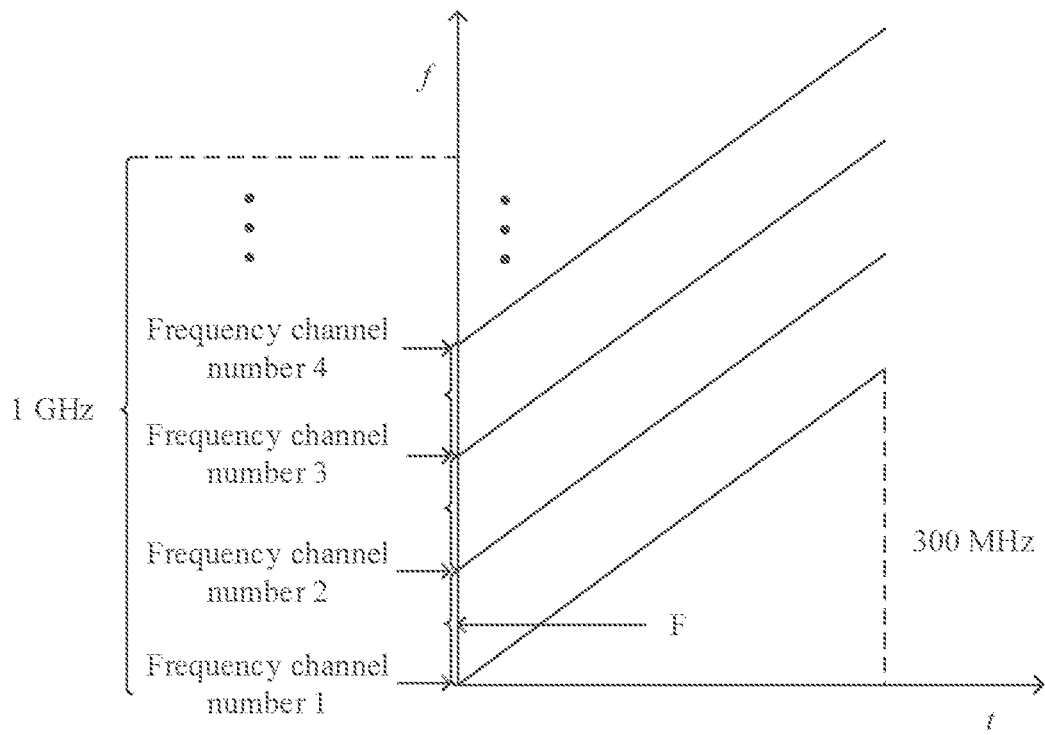
FIG. 8 provides a schematic diagram of a possible time-varying transmit frequency of a radar signal.

The following uses a sawtooth waveform radar as an example to describe in detail the foregoing calculation manner and implementation by using an example in which the N frequency bands or frequency points are used for a same type of radars (referring to the foregoing first optional manner). The N frequency points may be used for a plurality of types of radars, each type of radars uses the same or similar principle to transmit a signal in a corresponding frequency band. It should be noted that a radar waveform is not limited in this application. An available bandwidth of the radar is predefined or configured, for example, may be limited by a law and a regulation. The frequency sweep bandwidth of the radar may be one of a predefined or configured type, or one of a plurality of predefined or configured types, or may be determined based on performance of the radar. For details, refer to FIG. 8. FIG. 8 is a schematic diagram of a possible time-varying transmit frequency of a radar signal.

FIG. 8 shows that an available bandwidth of a radar is 1 GHz, a frequency sweep bandwidth is 300 MHz, and frequency points 1 to 4 belong to N frequency points, and are distributed at an equal interval in frequency domain. Intervals are respectively a first threshold F. The number of frequency points is related to the first threshold F and the available bandwidth, and the frequency sweep bandwidth of the radar signal cannot exceed a range of the available bandwidth.

It should be noted herein that, when the radar starts to work, a frequency band may be randomly selected from the N frequency bands as the frequency sweep band. As shown in the following figure, the radar randomly selects a frequency point, and transmits the radar signal in the frequency band defined by the frequency point and the frequency sweep bandwidth by using a frequency of the frequency point as an initial frequency. In a certain period of observation time, the radar performs filtering detection on the received signal. If an interference signal is detected in each frequency band of the N frequency bands, a frequency sweep band in which the radar signal is sent keeps unchanged. Alternatively, if the radar detects no interference signal in one or more frequency bands of the N frequency bands, the radar determines, in a next transmission cycle or a current transmission cycle, one frequency band of the one or more frequency bands as a frequency sweep band. Alternatively, if the radar detects an interference signal on a frequency sweep band in a current transmission cycle, the radar determines a frequency band in other frequency bands other than the current frequency sweep band of the N frequency bands, and the frequency band is used as a frequency sweep band of a next transmission cycle. Further, if there are few vehicles, and a plurality of frequency bands of the N frequency bands are in an idle state in a plurality of observation periods of time, the observation time is appropriately prolonged, until most frequency bands of the N frequency bands are in a busy state again, and the observation time is shortened. The observation time may be preconfigured.

In the following various optional designs, F=F1 is used as an example for description. For a case in which F>F1, specific description may be made with reference to the foregoing description.

In a first optional design, F1 is a frequency change range of the radio signal in a first time length T1, and T1=T2. T2 is a delay corresponding to a maximum ranging distance $d_{max}$.

Figure 9:
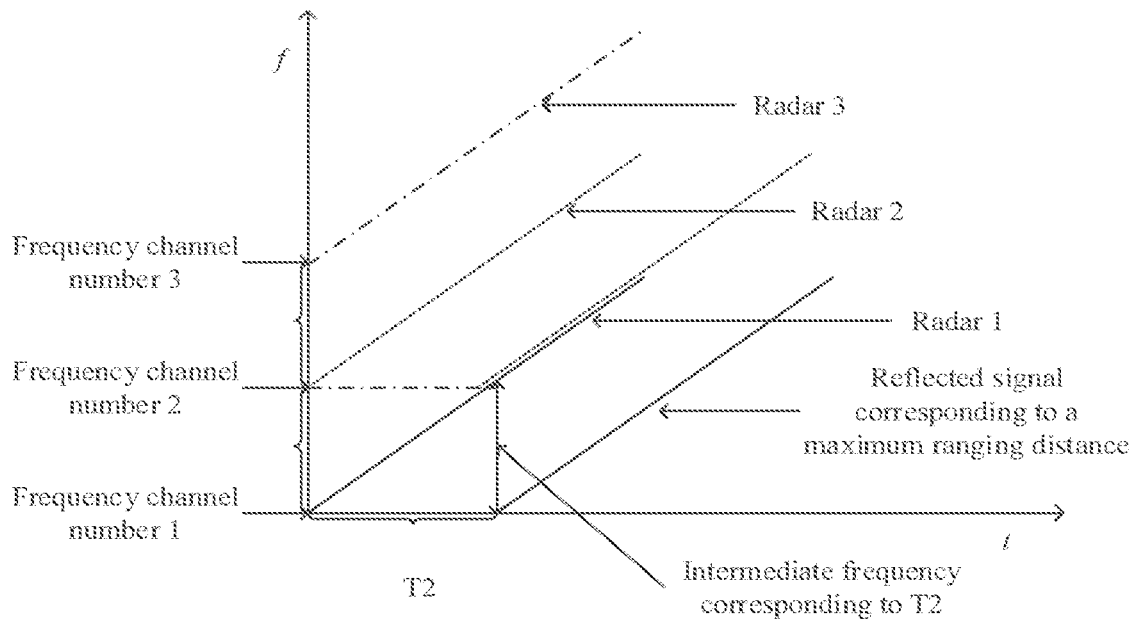
FIG. 9 provides a first schematic diagram of a time-varying transmit/receive frequency of a radar signal.

FIG. 9 is a first schematic diagram of a time-varying transmit/receive frequency of a radar signal. As shown in FIG. 9, the intermediate frequency is in direct proportion to the target distance in a linear relationship. Each radar has a maximum ranging distance, and corresponds to a maximum intermediate frequency. It should be noted herein that the intermediate frequency is classified into a positive intermediate frequency and a negative intermediate frequency, and is used to distinguish whether a frequency difference is a positive value or a negative value. For example, an absolute value of a frequency difference between a transmitted signal of a radar 1 and a reflected signal of the radar 1 or a transmitted signal of radar 2 is the same at a same moment, but a difference between a frequency of the transmitted signal of the radar 1 and a transmit frequency of the radar 2 is a negative value, namely, a negative intermediate frequency. A difference between the frequency of the transmitted signal of the radar 1 and a frequency of the reflected signal of the radar 1 is a positive value, namely, a positive intermediate frequency.

In the first optional design, a frequency domain spacing between adjacent frequency points is a frequency domain change range in T2, namely, an intermediate frequency corresponding to the maximum ranging distance. In this case, a frequency change curve of the transmitted signal and a frequency change curve of the reflected signal of the radar 2 do not fall between a frequency change curve of the transmitted signal and a frequency change curve of the reflected signal of the radar 1. In other words, a dashed line does not fall between two solid lines. If the radar has a capability of distinguishing between the positive intermediate frequency and the negative intermediate frequency, the ghost case mentioned in the background is not occur. In addition, a low-pass filter in the radar filters out frequency components that are higher than the intermediate frequency. Considering that the transmitted signal of the radar 2 may have a delay, for specific delay considerations, refer to related descriptions in other optional designs below. As shown in FIG. 9, if the radar 1 receives a transmitted signal of a radar 3 (dot-dashed line), after the transmitted signal passes through a frequency mixer and the low-pass filter, an intermediate frequency signal generated by interference of the radar 3 is filtered out, and a signal to interference plus noise ratio (SINR) of the radar 1 is not affected.

For example, if the maximum ranging distance of the radar is 200 m, the frequency sweep bandwidth of the radar signal is 300 MHz, and a cycle of the radar signal is 14 microseconds (μs). The intermediate frequency IF corresponding to the maximum ranging distance is calculated as follows:

$$IF = \frac{2d_{max}}{c * \Delta T} * \Delta F = 28.6 \text{ MHz}.$$

In this case, F1 is equal to 28.6 MHz.

If the radar cannot distinguish between the positive intermediate frequency and the negative intermediate frequency, for the radar 1, at a same moment, an absolute value of a frequency difference between the transmitted signal of the radar 1 and the transmitted signal of the radar 2 is the same as an absolute value of a frequency difference between the transmitted signal of the radar 1 and the reflected signal of the radar 1. Further, even if T1 is greater than T2, if T1 is not large enough, the frequency change curve of the reflected signal of the radar 2 still falls within an area between the frequency change curve of the transmitted signal of the radar 2 and the frequency change curve of the reflected signal of the radar 1, as shown in FIG. 9, causing interference and generating a ghost phenomenon. In this case, a second optional design needs to be introduced.

In the second optional design, F1 is a frequency change range of the radio signal in a first time length T1, F1 is a frequency change range T1=M*T2 of the radio signal in the first time length T1, T2 is a delay corresponding to a maximum ranging distance d and M is a positive number greater than 1. For example, M=2.

Figure 10:
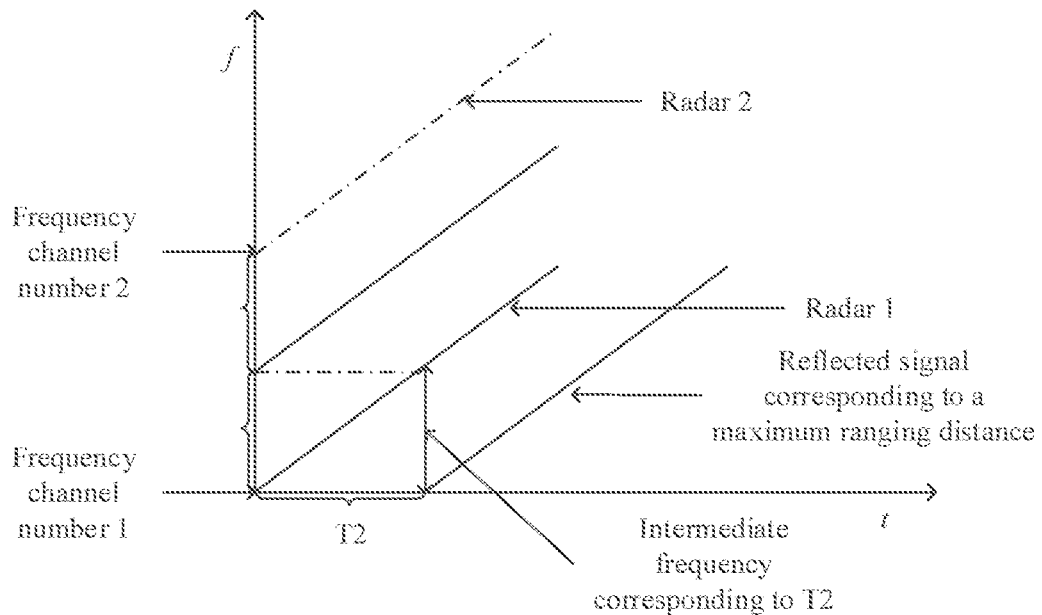
FIG. 10 provides a second schematic diagram of a time-varying transmit/receive frequency of a radar signal.

FIG. 10 is a second schematic diagram of a time-varying transmit/receive frequency of a radar signal. As shown in FIG. 10, a frequency domain spacing between adjacent frequency points is two times a frequency domain change range in T2, in other words, two times the intermediate frequency corresponding to the maximum ranging distance. In this case, the frequency change curves of the transmitted signal (dot-dashed line) and the reflected signal (not shown in the figure) of the radar 2 do not fall between the frequency change curves of the transmitted signal and the reflected signal of the radar 1, and do not fall within the area (between the two solid lines on the top) that causes the negative intermediate frequency. Even if the radar does not have a capability of distinguishing between the positive intermediate frequency and the negative intermediate frequency, the ghost case mentioned in the background does not occur.

Based on the example in the first optional design, in the second optional design, F1 is equal to twice IF, that is, 57.2 MHz.

Figure 11:
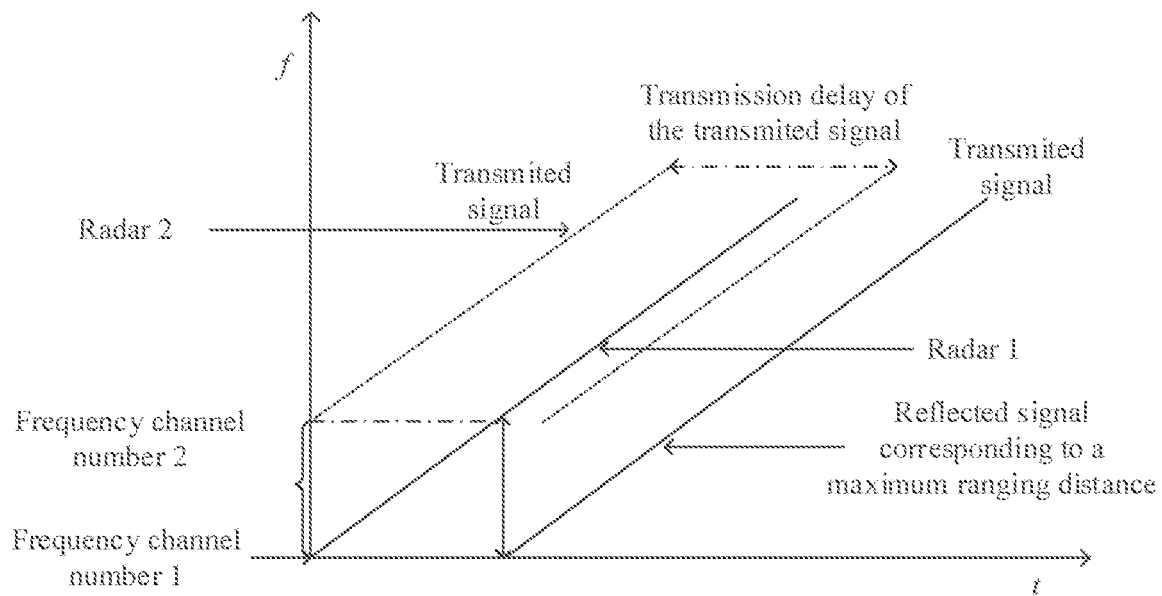
FIG. 11 provides a third schematic diagram of a time-varying transmit/receive frequency of a radar signal.

A person skilled in the art may know that, for two radars that are at a specific distance from each other, even if the two radars start to transmit signals at the same time, a signal transmission delay still exists due to a distance. Due to this transmission delay, in two radars that have different frequency sweep bands and transmit signals at the same time, a transmitted signal of one radar interferes with the other radar after the delay. As shown in FIG. 11, FIG. 11 is a third schematic diagram of a time-varying transmit/receive frequency of a radar signal. The transmission delay of the transmitted signal of the radar 2 is generated due to the distance. As a result, a frequency change curve of the transmitted signal after the transmission delay falls within an area between the frequency change curve of the transmitted signal of the radar 1 and the frequency change curve of the reflected signal of the radar 1. Consequently, the transmitted signal of the radar 2 interferes with the radar 1. Refer to FIG. 11. To resolve this problem, when the first threshold F is determined, a delay caused by a maximum interference tolerance distance further needs to be considered.

Further, the transmitted signal of the radar 2 (interference radar) is received by the radar 1 after a specific transmission delay. After the specific transmission delay of the transmitted signal, power of the transmitted signal is equal to noise power. A distance corresponding to this transmission delay is the maximum interference tolerance distance. When the distance between radars is greater than the maximum interference tolerance distance, after the delay of the transmitted signal of the radar 2, the signal power is less than the noise power, and no substantial interference is caused (which may be ignored). In addition, the reflected signal of the radar 2 is attenuated due to reflection. Even if the reflected signal is received by the radar 1, power of the reflected signal is less than power of the received transmitted signal, and no substantial interference is caused.

Figure 12:
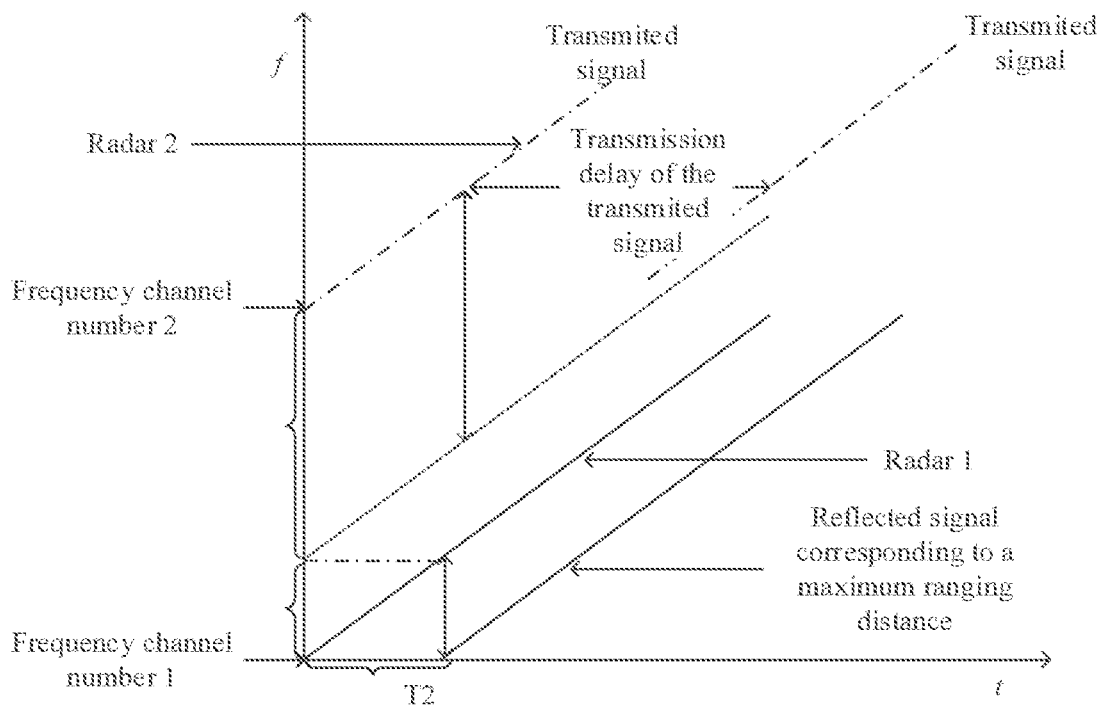
FIG. 12 provides a fourth schematic diagram of a time-varying transmit/receive frequency of a radar signal.

Based on the first optional design, in a third optional design, F1 is a frequency change range of the radio signal in a first time length T1, and T1=T2+T4. T2 is a delay corresponding to the maximum ranging distance $d_{max}$. T4 is a delay corresponding to the interference maximum tolerance distance. For details. FIG. 12 is a fourth schematic diagram of a time-varying transmit/receive frequency of a radar signal.

As shown in FIG. 12, on the basis of the first optional design, the interference caused by the delay caused by the distance between radars is further avoided. A frequency difference (a frequency domain interval when the N frequency points are distributed at an equal interval) between adjacent frequency point 1 and a frequency point 2 in the N frequency points further increases a frequency range corresponding to T4 on the basis of the frequency range corresponding to T2. In a case in which the radar can distinguish between the positive intermediate frequency and the negative intermediate frequency, the foregoing frequency difference can ensure that when the radar 2 transmits the radar signal at the frequency point 2 or at a position at which the absolute value of the frequency difference is larger, the transmitted signal and the reflected signal after a corresponding delay do not interfere with the radar 1. In other words, the frequency change curve of the reflected signal of the radar 2 does not fall within two solid line ranges, to avoid interference to the radar 1. Further, in a scenario in which a requirement on distance resolution is not high, if the reflected signal attenuates greatly, even if the radar cannot distinguish between the positive intermediate frequency and the negative intermediate frequency, the reflected signal cannot cause interference to the radar 1.

Based on the second optional design, in a fourth optional design. F1 is a frequency change range of the radio signal in a first time length T1, T1=M*T2+T4, T2 is a delay corresponding to the maximum ranging distance $d_{max}$, and M is a positive number greater than 1, for example, M=2.

Further, with reference to the description of the second optional design, a frequency difference (a frequency domain interval when the N frequency points are distributed at an equal interval) between the adjacent frequency point 1 and the frequency point 2 in the N frequency points further increases a frequency range corresponding to T4 on the basis of a frequency range corresponding to M*T2. In this way, the frequency change curve of the reflected signal of the radar 2 does not fall between the frequency change curve of the transmitted signal of the radar 1 and the frequency change curve of the reflected signal of the radar 1, and does not fall within an area (an area between a dashed line and a solid line in FIG. 12) that causes the negative intermediate frequency. In a case in which the radar cannot distinguish between the positive intermediate frequency and the negative intermediate frequency, the foregoing frequency difference can ensure that when the radar 2 transmits the radar signal, the transmitted signal and the reflected signal after a corresponding delay does not cause interference to the radar 1.

When the transmission delay caused by the distance is considered, there is another possible design. In other words, a frequency change range with a relatively large frequency domain change range in T2 and T4 is used to calculate F1.

In a fifth optional design, F1 is a frequency change range of the radio signal in a first time length T1, and T1=max(T2,T4). T2 is a delay corresponding to the maximum ranging distance $d_{max}$. T4 is a delay corresponding to the interference maximum tolerance distance.

In this optional design, when the radar can distinguish between the positive intermediate frequency and the negative intermediate frequency, it can be ensured that radars working in different frequency sweep bands do not interfere with each other, to avoid the false alarm or improve interference signal strength. In addition, a maximum quantity of radars that do not interfere with each other can be supported in a limited available bandwidth, to greatly increase frequency band utilization. Further, in a scenario in which a requirement on distance resolution is not high, the maximum ranging distance is large enough. Even if the radar cannot distinguish between the positive intermediate frequency and the negative intermediate frequency, the transmitted signal and the reflected signal of the radar 2 may not cause interference to the radar 1.

A person skilled in the art may know that a same type of radars has a same transmission cycle, and a start moment of each transmission cycle is aligned in time domain, which is an ideal transmission state. In a specific scenario, it is very likely that different radars cannot really start transmission at a same moment. In other words, there is an error between a transmission moment of the radar 2 and a transmission moment of the radar 1. In other words, a signal of the radar 2 is transmitted later than a signal of the radar 1. There are many causes for this error. For example, precision of GPS used for transmission timing is different, and therefore, timing cannot be accurate. For another example, timing accuracy of the radars is different. There may be another possible transmit timing error. A transmit timing moment error T3 in this embodiment of this application may include one or more of all possible transmit timing moment errors.

Figure 13A:
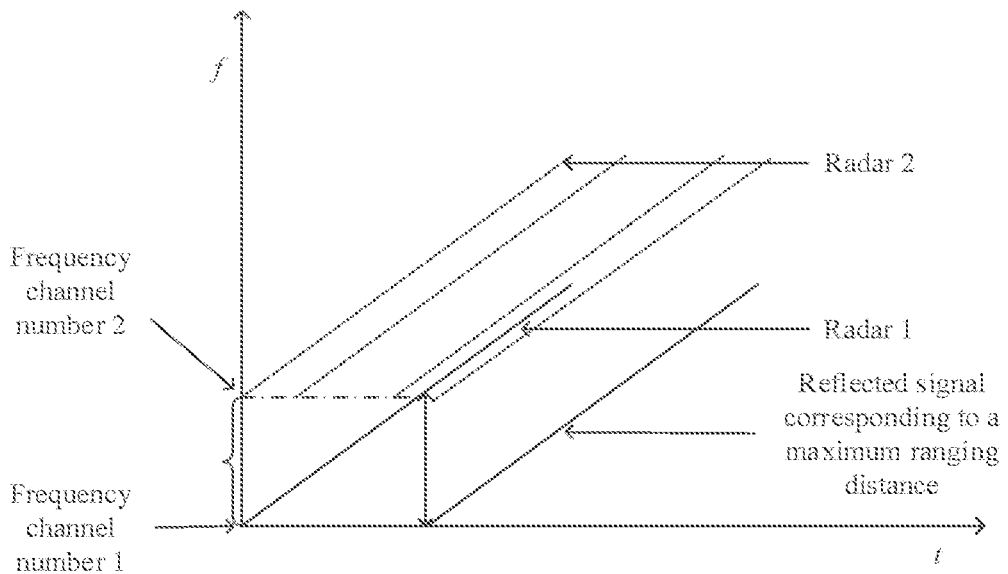
FIG. 13A provides a fifth schematic diagram of a time-varying transmit/receive frequency of a radar signal.

FIG. 13A is a fifth schematic diagram of a time-varying transmit/receive frequency of a radar signal. If this error is not considered, the frequency change curve of the transmitted signal of the radar 2 falls within an implementation area. Therefore, due to existence of the error at a transmission moment, the reflected signal of the radar 2 interfere with radar 1. FIG. 13A is described as an example based on the first optional design. A person skilled in the art may know that a transmission moment error may be considered in any one of the foregoing optional designs.

Based on the first optional design, in a sixth optional design, F1 is a frequency change range of the radio signal in the first time length T1, and T1=T2+T3. T2 is a delay corresponding to the maximum ranging distance $d_{max}$, T3 is a transmit timing moment error.

Figure 13B:
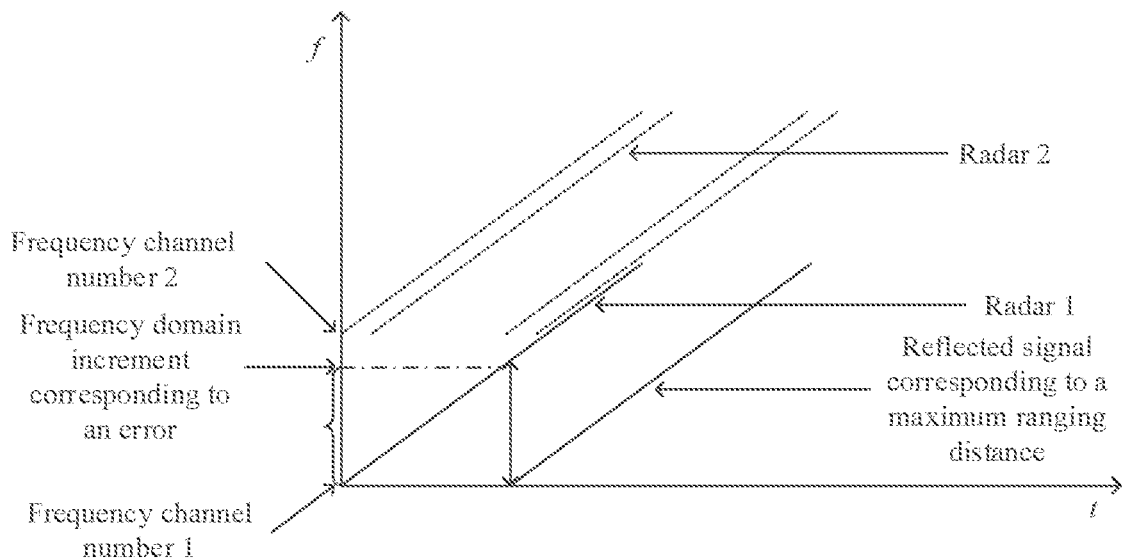
FIG. 13B provides a sixth schematic diagram of a time-varying transmit/receive frequency of a radar signal.

FIG. 13B is a sixth schematic diagram of a time-varying transmit/receive frequency of a radar signal. On the basis of the frequency domain spacing between the adjacent frequency 1 and the frequency 2 is in a frequency domain change range in T2, a frequency domain change range in T3 is further added. If the radar has the capability of distinguishing between the positive intermediate frequency and the negative intermediate frequency, the frequency change curve (dashed line) of the reflected signal of the radar 2 does not fall within the range of the solid line, and does not cause interference to the radar 1.

A person skilled in the art may know that, in the sixth optional design, consideration of a transmission moment error may be applied to any one of the second to fifth optional designs. With reference to the description in the sixth optional design, the following optional design further exists.

Based on the second optional design, in a seventh optional design, F1 is a frequency change range of the radio signal in a first time length T1, and F1 is a frequency change range T1=M*T2+T3 of the radio signal in the first time length T1. T2 is a delay corresponding to the maximum ranging distance $d_{max}$. T3 is a transmit timing moment error, and M is a positive number greater than 1, for example, M=2.

Based on the third optional design, in an eighth optional design. F1 is a frequency change range of the radio signal in a first time length T1, and T1=T2+T4+T3. T2 is a delay corresponding to the maximum ranging distance $d_{max}$. T4 is a delay corresponding to the interference maximum tolerance distance. T3 is a transmit timing moment error. For details, refer to FIG. 14.

Figure 14:
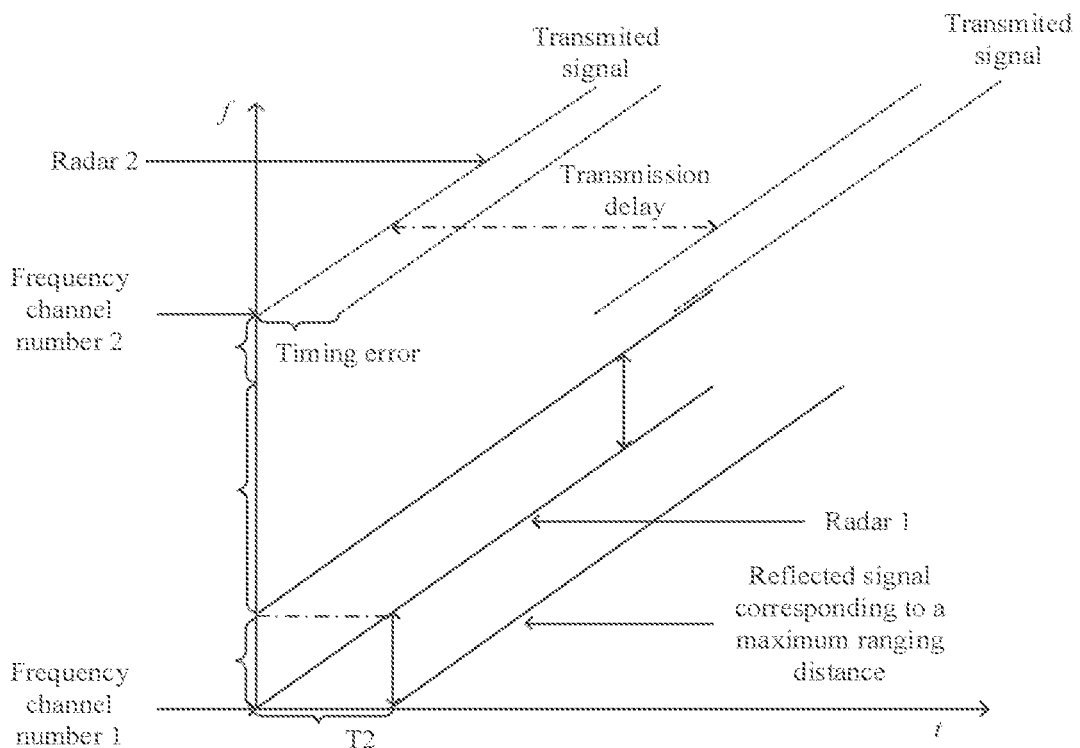
FIG. 14 provides a seventh schematic diagram of a time-varying transmit/receive frequency of a radar signal.

FIG. 14 is a seventh schematic diagram of a time-varying transmit/receive frequency of a radar signal. It can be learned from FIG. 14 that an absolute value of a frequency difference between the adjacent frequency point 1 and the frequency point 2 comprehensively considers a delay caused by the maximum ranging distance, the maximum interference tolerance distance, and the frequency change range in the transmit timing moment error. When the radar 2 transmits a signal in a frequency band corresponding to the frequency 2, for the radar 1 having the capability of distinguishing between the positive intermediate frequency and the negative intermediate frequency, regardless of the transmitted signal and the reflected signal of the radar 2, a frequency change curve does not fall into an area in a middle of a frequency change curve of the transmitted signal and a frequency change curve of the reflected signal of the radar 1. For a radar 1 without the capability of distinguishing between the positive intermediate frequency and the negative intermediate frequency, the transmitted signal of the radar 2 does not fall within the area that causes the negative intermediate frequency (between the two solid lines in FIG. 14). In addition, a delay caused by the maximum interference tolerance distance is considered, after the reflected signal of the radar 2 is attenuated due to reflection, interference caused to the radar 1 by the reflected signal of the radar 2 may be ignored. Therefore, the transmitted signal and the reflected signal of the radar 2 does not cause interference to the radar.

For example, if an available bandwidth of the radar 1 is 1 GHz, the maximum ranging distance is 250 m, the frequency sweep time (or referred to as a cycle) is 14 µs, and the frequency sweep bandwidth is 200 MHz, the frequency change range (or IF) in the delay T2 caused by the maximum ranging distance is as follows:

$$IF = \frac{2d_{max}}{c*\Delta T} * \Delta F = 23.8 \text{ MHz}.$$

Assuming that the transmission delay T4 caused by the interference maximum tolerance distance is 2 µs, and the transmit timing moment error T3 between radars is 0.5 µs, a value of F is:

$$IF + \Delta F4 + \Delta F3 = IF + \frac{\Delta F}{\Delta T} * T4 + \frac{\Delta F}{\Delta T} * T3 = 59.5 \text{ MHz}.$$

Therefore, when the first threshold F is equal to F1, an absolute value of a difference between lowest frequencies of any two frequency bands in the N frequency bands is a positive integer multiple of 59.5, so that about N=13 frequency bands are supported in a bandwidth of 1 GHz.

Based on the fourth optional design, in a ninth optional design. F1 is a frequency change range of the radio signal in a first time length T1, T1=M*T2+T4+T3, T2 is a delay corresponding to the maximum ranging distance $d_{max}$, and M is a positive number greater than 1, for example, M=2. T3 is a transmit timing moment error.

Based on the fifth optional design, in a tenth optional design, F1 is a frequency change range of the radio signal in a first time length T1, and T1=max(T2,T4)+T3. T2 is a delay corresponding to the maximum ranging distance $d_{max}$. T4 is a delay corresponding to the interference maximum tolerance distance. T3 is a transmit timing moment error.

The foregoing embodiment describes radar signal processing in frequency domain in a detection method. The following describes some possible processing manners in time domain.

Embodiment 2

Figure 15:
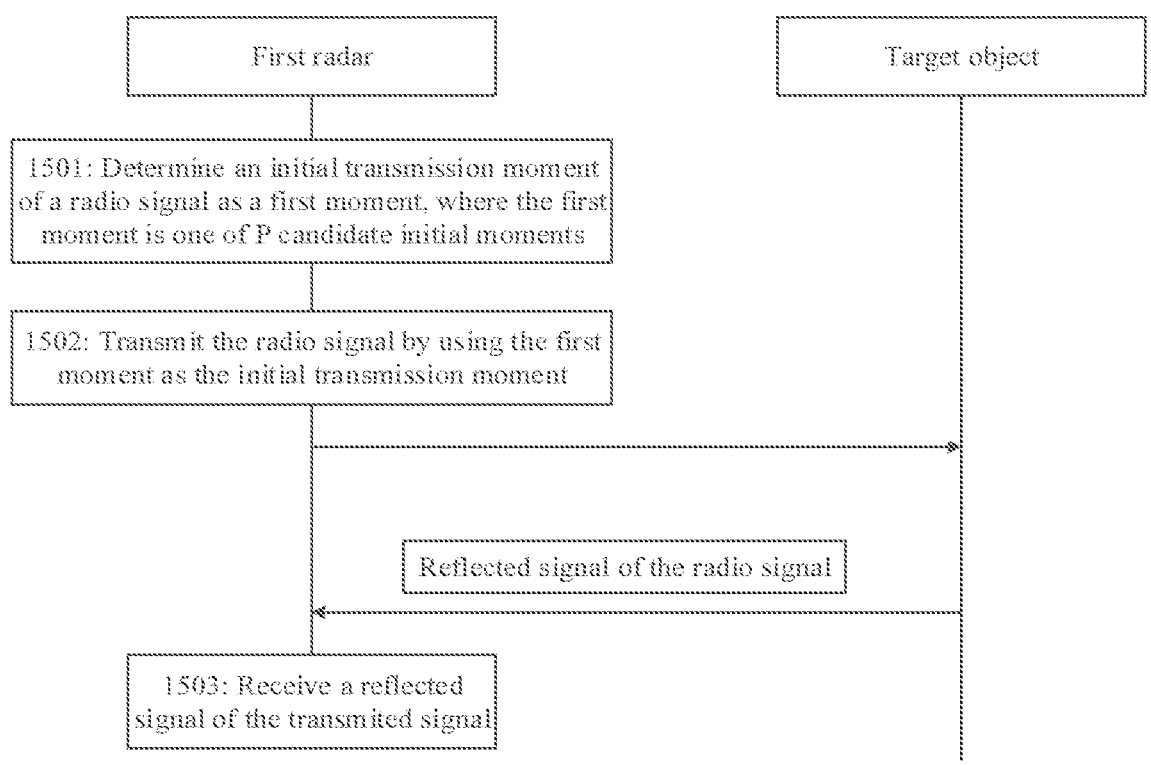
FIG. 15 is a schematic flowchart of a possible detection method.

FIG. 15 is a schematic flowchart of a possible detection method, applied to a detection apparatus. The method in this embodiment includes the following steps.

Step 1501: Determine an initial transmission moment of the radio signal as a first moment, where the first moment is one of P candidate initial moments.

Step 1502: Transmit the radio signal by using the first moment as the initial transmission moment.

Optionally, the method further includes step 1503: Receive a reflected signal of the transmitted signal.

It should be noted that the detection method provided in this embodiment may be separately implemented, or may be implemented in combination with the detection method provided in Embodiment 1.

Similarly, the P candidate initial moments may be referred to as P "time domain grid points". By setting the time domain grid points, when a radar initially transmits a signal, the radar can select only the initial transmitting moment from the P time domain grid points, to reduce mutual interference between radars.

In an optional design, a time interval between any two of the P candidate initial moments is a positive integer multiple of a third threshold.

Further optionally, the third threshold is less than or equal to frequency sweep time of the radio signal.

Further optionally, the P candidate initial moments are applied to all radars, and types of all the radars may be the same or different, or the P candidate initial moments are applied only to radars of a same type.

If the P candidate initial moments are applied only to radars of a same type, for example, a first type. For other types of radars, for example, a second type, there may be a corresponding plurality of candidate initial moments.

In an optional design, the P candidate initial moments are distributed at an equal interval in time domain, and the interval is the third threshold. The third threshold is T2, T2=2*$d_{max}$/c, and $d_{max}$ is a maximum detection distance.

Further optionally, for a second type radar, there may be P candidate initial moments.

A time interval between any two candidate initial moments of the P candidate initial moments is a positive integer multiple of a fourth threshold, and the fourth threshold is different from the third threshold. Optionally, the fourth threshold may be a delay corresponding to a maximum ranging distance of the second type radar.

It should be noted that, when the detection method provided in this embodiment is implemented in combination with the detection method provided in Embodiment 1, compared with the other approaches, more radars can be supported on a same time frequency resource for communication, and mutual interference between radars can be effectively reduced or avoided.

The foregoing mainly describes the solutions provided in the embodiments of this application from a perspective of interaction between a detection apparatus, for example, a radar, and a detection apparatus, or between a detection apparatus and a target object. It may be understood that, to implement the foregoing functions, apparatuses such as the detection apparatus and the target object include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 16:
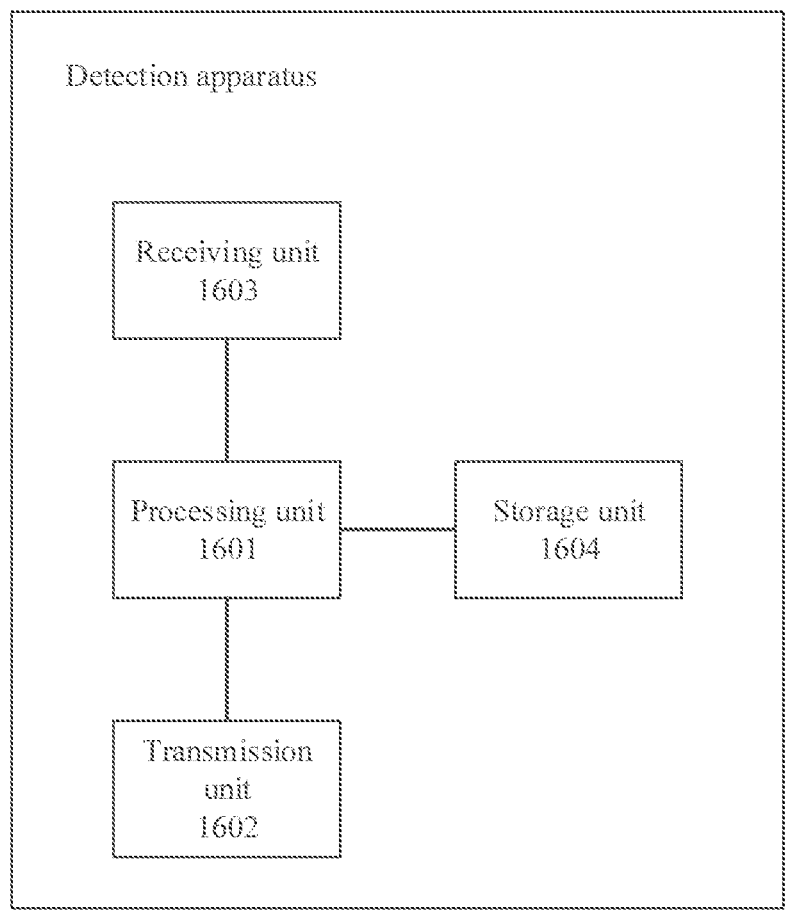
FIG. 16 provides a possible schematic diagram of a structure of a detection apparatus.

FIG. 16 is a possible schematic diagram of a structure of a detection apparatus in the foregoing embodiments.

The detection apparatus includes a processing unit 1601 and a transmission unit 1602. Based on an actual requirement, the network device further includes a receiving unit 1603. Optionally, the detection apparatus may further include a storage unit 1604, configured to store a program instruction and/or data.

In an optional design: the processing unit is configured to determine a first frequency band, and the first frequency band is one of N frequency bands, and the transmission unit is configured to transmit a radio signal in the first frequency band.

Optionally, the receiving unit is configured to receive a reflected signal of the radio signal.

A bandwidth of the first frequency band is a frequency sweep bandwidth of the radio signal transmitted by the first radar. The frequency sweep bandwidth of the radar in this application is understood as a frequency sweep bandwidth of a signal transmitted by the radar.

Optionally, the processing unit further determines a first frequency, and the first frequency is a frequency of a first frequency point in N frequency points. For the explanation of the frequency point, reference may be made to the description in the method embodiment.

It should be noted that, for a specific implementation of the detection method performed by the detection apparatus in this optional design, refer to descriptions provided in related parts in FIG. 7 to FIG. 14 in the foregoing method Embodiment 1 of this application. The detection apparatus in this embodiment of this application and the detection method corresponding to method Embodiment 1 are based on a same concept, and a technical effect brought by the detection apparatus is the same as that brought by the foregoing resource scheduling method. Specific functions of the processing unit 1601, the transmission unit 1602, and the receiving unit 1603 included in the detection apparatus in this embodiment, and any features, terms, and implementation details involved in the processing unit 1601, the transmission unit 1602, and the receiving unit 1603 correspond to functions of the detection apparatus in the method embodiments corresponding to FIG. 7 to FIG. 14. For specific content, refer to the descriptions in the method embodiments corresponding to FIG. 7 to FIG. 14 in this application. Details are not described herein again.

In another optional design, the processing unit is configured to determine an initial transmission moment of the radio signal as a first moment, where the first moment is one of P candidate initial moments, and the transmitting unit is configured to transmit the radio signal by using the first moment as the initial transmission moment.

Optionally, the receiving unit is further configured to receive the reflected signal of the transmitted signal.

The optional design may be implemented independently, or may be integrated with the previous optional design.

It should be noted that, for a specific implementation of the detection method performed by the detection apparatus in the optional design, refer to the description provided in the related part in FIG. 15 in the foregoing method Embodiment 2 of this application. The detection apparatus in this embodiment of this application and the detection method corresponding to method Embodiment 2 are based on a same concept, and technical effects brought by the detection apparatus are the same as those brought by the detection method. Specific functions of the processing unit 1601, the transmission unit 1602, and the receiving unit 1603 included in the detection apparatus in this embodiment, and any features, terms, and implementation details involved in the processing unit 1601, the transmission unit 1602, and the receiving unit 1603 correspond to functions of the detection apparatus in the method embodiment corresponding to FIG. 15. For specific content, refer to the descriptions in the method embodiment corresponding to FIG. 15 in this application. Details are not described herein again.

It should be noted that, in the foregoing embodiments, all or some of the detection apparatus may be implemented by using software, hardware, firmware, or any combination thereof.

In an optional manner, a corresponding component in the foregoing embodiment may be implemented by corresponding hardware, or may be implemented by corresponding hardware by executing corresponding software. For example, the receiving unit 1603 may be hardware that has a function of performing the foregoing receiving function, for example, a transceiver that integrates a transceiver function or a receiver that implements only a receiving function, or may be a general processor or another hardware device that can execute a corresponding computer program to complete the foregoing functions, or may be a software module or a functional unit that performs a corresponding function. For another example, the processing unit 1601 may be hardware that has a function of executing the processor, for example, a processor having a specific function, or a general processor, or may be another hardware device that can execute a corresponding computer program to complete the foregoing function, or may be a software module or a functional unit that performs a corresponding function. For another example, the transmission unit 1602 may be hardware that has the foregoing sending function, for example, a transceiver that integrates a receiving and transmitting function, or a transmitter that implements only a transmitting function, or may be a general processor or another hardware device that can execute a corresponding computer program to complete the foregoing function, or may be a software module or a functional unit that performs a corresponding function. For another example, the foregoing storage unit may be hardware, software, or a functional unit that implements a storage function.

Figure 17:
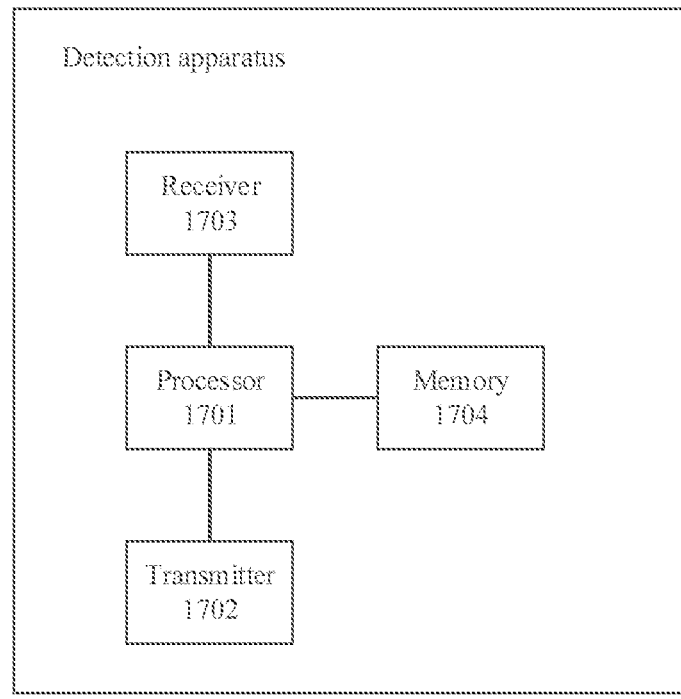
FIG. 17 is a possible schematic diagram of a structure of another detection apparatus.

FIG. 17 is a possible schematic diagram of a structure of another detection apparatus according to an embodiment of this application. The detection apparatus includes a processor 1701, a transmitter 1702, and a receiver 1703. Functions of the processor 1701, the transmitter 1702, and the receiver 1703 may be respectively corresponding to specific functions of the processing unit 1601, the transmission unit 1602, and the receiving unit 1603 shown in FIG. 16. Details are not described herein again. Optionally, the detection apparatus may further include a memory 1704, configured to store a program instruction and/or data.

Figure 18:
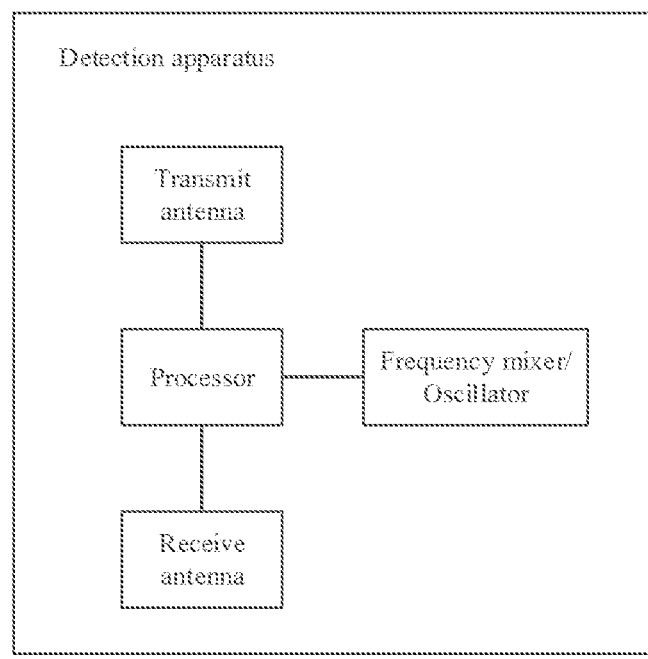
FIG. 18 is a possible schematic diagram of a structure of still another detection apparatus.

FIG. 2 is a schematic diagram of a structure of a radar apparatus. With reference to the foregoing content, another optional manner is proposed. FIG. 18 is a possible schematic diagram of a structure of still another detection apparatus. The detection apparatus provided in FIG. 16 to FIG. 18 may be a part or all of a radar apparatus in an actual communication scenario, and may be integrated into the radar apparatus or located outside the radar apparatus, to implement a corresponding function. A structure and composition are not limited.

In this optional manner, the detection apparatus includes a transmit antenna, a receive antenna, and a processor. Further, the detection apparatus further includes a frequency mixer and/or an oscillator. Further, the detection apparatus may further include a low-pass filter, a directional coupler, and/or the like. The transmit antenna and the receive antenna are configured to support the detection apparatus to perform radio communication, the transmit antenna supports transmission of a radio signal, and the receive antenna supports reception of the radio signal and/or reception of a reflected signal, to finally implement a detection function. The processor performs some possible determining and/or processing functions. Further, an operation of the transmit antenna and/or the receive antenna is also controlled. Further, the processor controls the transmit antenna to transmit a signal that needs to be transmitted, and a signal received by using the receive antenna may be transmitted to the processor for corresponding processing. The components included in the detection apparatus may be configured to perform any of the implementations involved in FIG. 7 to FIG. 15. Optionally, the detection apparatus may further include a memory, configured to store a program instruction and/or data. The transmit antenna and the receive antenna may be independently disposed, or may be integrated as a transmit/receive antenna to perform a corresponding transmit/receive function.

It should be noted that, for a specific implementation of the detection method performed by the detection apparatus in the optional manner, refer to descriptions provided in related parts in FIG. 7 to FIG. 15 in the foregoing method embodiments of this application. The detection apparatus and the detection method corresponding to FIG. 7 to FIG. 15 are based on a same concept, and a technical effect brought by the detection apparatus is the same as that of the foregoing detection method. The specific functions of each original part included in the detection apparatus in this embodiment and any features, terms, and implementation details involved therein correspond to the functions of the detection apparatus in the method embodiments corresponding to FIG. 7 to FIG. 15. For specific content, refer to the descriptions in the method embodiments corresponding to FIG. 7 to FIG. 15 in this application. Details are not described herein again.

In still another optional manner, when the detection apparatus is implemented by using software, all or some of the detection apparatus may be implemented in a form of a computer program product. The computer program product includes one or more computer instructions. When the computer program instructions are loaded and executed on the computer, the procedure or functions according to the embodiments of this application are all or partially implemented. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

It should be noted that the processor included in the detection apparatus configured to perform the detection method provided in this embodiment of this application may be a central processing unit (CPU), a general purpose processor, a digital signal processor (DSP), an application-specific integrated circuit (ASIC), a field-programmable gate array (FPGA), or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

Method or algorithm steps described in combination with the embodiments of this application may be implemented by hardware, or may be implemented by a processor by executing a software instruction. The software instruction may be formed by a corresponding software module. The software module may be located in a random-access memory (RAM), a flash memory, a read-only memory (ROM), an erasable programmable ROM (EPROM), an electrically EPROM (EEPROM), a register, a hard disk, a removable magnetic disk, a compact disc (CD) ROM (CD-ROM), or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the detection apparatus. Certainly, the processor and the storage medium may alternatively exist in the detection apparatus as discrete components.

It may be understood that FIG. 16 to FIG. 18 show merely a simplified design of the detection apparatus. In an actual application, the detection may include any quantity of transmitters, receivers, processors, controllers, memories, and other elements that may exist.

An embodiment of this application further provides a communications system, including at least one detection apparatus and/or at least one target object mentioned in the foregoing embodiments of this application.

An embodiment of this application further provides a communications system. The communications system includes at least one detection apparatus and/or at least one central processing unit and/or central controller that are mentioned in the foregoing embodiments of this application. The central processing unit/central controller is configured to control travelling of a vehicle and/or processing of another detection apparatus based on an output of the at least one detection apparatus. The central processing unit/central controller may be located in the vehicle, or in another possible position, to implement the control.

It should be understood that "an embodiment", "one embodiment", or "this embodiment of this application" mentioned in the whole specification does not mean that particular features, structures, or characteristics related to the embodiment are included in at least one embodiment of this application. Therefore, "in an embodiment", "in one embodiment", or "in this embodiment of this application" appearing throughout the specification does not refer to a same embodiment. In addition, these particular features, structures, or characteristics may be combined in one or more embodiments by using any appropriate manner.

It should be understood that certainty sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a detection apparatus, wherein the method comprises:
    determining a first frequency point of N frequency points, wherein N is a positive integer greater than 1; and
    transmitting a radio signal in a first frequency band of N frequency bands,
    wherein the first frequency point is in the first frequency band,
    wherein a bandwidth of the first frequency band is a frequency sweep bandwidth of the radio signal,
    wherein either:
        one of the N frequency bands partially overlaps at least one of other N−1 frequency bands of the N frequency bands, and an absolute value of a difference between lowest frequencies of any two of the N frequency bands is not less than a first threshold (F); or
        the N frequency bands have at least one second frequency band that partially overlaps the first frequency band, and an absolute value of a difference between a lowest frequency of each of the at least one second frequency band and a lowest frequency of the first frequency band is not less than F, wherein F is related to a maximum detection distance, a maximum interference tolerance distance, or a transmit timing moment error, and wherein F is greater than a first frequency change range (F1) of the radio signal in a first time length (T1).

2. The method of claim 1, wherein F is greater than or equal to a frequency change range of the radio signal in a first time length (T1), wherein a value of T1 satisfies one of:

$$T1=T2;$$

$$T1=M*T2;$$

$$T1=T2+T4;$$

$$T1=\max(T2,T4);$$

$$T1=T2+T3;$$

$$T1=M*T2+T3;$$

$$T1=T2+T3+T4; \text{ or}$$

$$T1=\max(T2,T4)+T3,$$

wherein $T2=2*d_{max}/c$, wherein $d_{max}$ is the maximum detection distance, wherein T3 is the transmit timing moment error, wherein $T4=\text{dif}_{max}/c$, wherein $\text{dif}_{max}$ is the maximum interference tolerance distance, wherein c is a speed of light, and wherein M is an integer greater than or equal to 2.

3. The method of claim 1, wherein F and F1 satisfy: $F=F1+\Delta$, and wherein $\Delta$ is a predefined constant or a configured constant.

4. The method of claim 1, wherein the radio signal is transmitted in the first frequency band of the N frequency bands by a first radar of the detection apparatus, and wherein either:

an absolute value of a difference between a lowest frequency of one of the N frequency bands other than the first frequency band and the lowest frequency of the first frequency band is a positive integer multiple of F; or the N frequency bands have at least one third frequency band used by a second radar of the detection apparatus, the second radar is of a different type and has a different maximum ranging distance than the first radar, and an absolute value of a difference between a lowest frequency of each of the at least one third frequency band and the lowest frequency of the first frequency band is an integer multiple of a second threshold (F') that is not equal to F.

5. The method of claim 1, wherein a transmission cycle of the radio signal is T, and wherein the method further comprises further transmitting the radio signal in the first frequency band in a current transmission cycle.

6. The method of claim 5, further comprising transmitting, in a previous transmission cycle or in a next transmission cycle of the current transmission cycle, the radio signal in a frequency band other than the first frequency band in the N frequency bands, wherein an absolute value of a difference between a lowest frequency of the frequency band and the lowest frequency of the first frequency band is a positive integer multiple of F.

7. The method of claim 1, further comprising:
selecting a candidate frequency band from the N frequency bands; and
switching from the first frequency band to the candidate frequency band in response to detecting interference on the first frequency band.

8. The method of claim 1, wherein Q frequency points in the N frequency points are distributed at an equal interval in a frequency domain, and wherein an absolute value of a frequency difference between two adjacent frequency points of the Q frequency points in the frequency domain is F.

9. The method of claim 1, wherein a frequency of the first frequency point is a lowest frequency of the first frequency band, a highest frequency of the first frequency band, or a center frequency of the first frequency band.

10. The method of claim 1, wherein the lowest frequencies of the N frequency bands are distributed at an equal interval in a frequency domain.

11. An apparatus comprising:
a memory configured to store program instructions; and
a processor coupled to the memory, wherein the program instructions cause the processor to be configured to:
determine a first frequency point of N frequency points, wherein N is a positive integer greater than 1; and
transmit a radio signal in a first frequency band of N frequency bands,
wherein the first frequency point is in the first frequency band, wherein a bandwidth of the first frequency band is a frequency sweep bandwidth of the radio signal,
wherein either:
one of the N frequency bands partially overlaps at least one of other N−1 frequency bands of the N frequency bands, and an absolute value of a difference between lowest frequencies of any two frequency bands of the N frequency bands is not less than a first threshold (F); or
the N frequency bands have at least one second frequency band that partially overlaps the first frequency band, and an absolute value of a difference between a lowest frequency of each of the at least one second frequency band and a lowest frequency of the first frequency band is not less than F,
wherein F is related to a maximum detection distance, a maximum interference tolerance distance, or a transmit timing moment error, and
wherein F is greater than a first frequency change range (F1) of the radio signal in a first time length (T1).

12. The apparatus of claim 11, wherein F is greater than or equal to a frequency change range of the radio signal in a first time length (T1), wherein a value of T1 satisfies one of:

$$T1=T2;$$

$$T1=M*T2;$$

$$T1=T2+T4;$$

$$T1=\max(T2,T4);$$

$$T1=T2+T3;$$

$$T1=M*T2+T3;$$

$$T1=T2+T3+T4; \text{ or}$$

$$T1=\max(T2,T4)+T3,$$

wherein T2 is a delay associated with the maximum detection distance, wherein T3 is a transmit timing moment error, wherein T4 is a delay associated with a maximum interference tolerance distance, and wherein M is an integer greater than or equal to 2.

13. The apparatus of claim 11, wherein the first frequency change range is a product of a transmitted signal slope and T1.

14. The apparatus of claim 11, wherein either:
an absolute value of a difference between a lowest frequency of one of the N frequency bands other than the first frequency band and the lowest frequency of the first frequency band is a positive integer multiple of F; or
the N frequency bands have at least one third frequency band, and an absolute value of a difference between a lowest frequency of each of the at least one third frequency band and the lowest frequency of the first frequency band is not a positive integer multiple of F.

15. The apparatus of claim 11, wherein a transmission cycle of the radio signal is T, and wherein the program instructions further cause the processor to be further configured to:
obtain the first frequency band based on F; and
transmit the radio signal in the first frequency band in a current transmission cycle.

16. The apparatus of claim 11, wherein the N frequency points are predefined.

17. The apparatus of claim 11, wherein the N frequency points are distributed at an equal interval in a frequency domain, and wherein an absolute value of a frequency difference between two adjacent frequency points in the frequency domain is F.

18. The apparatus of claim 11, wherein a frequency of the first frequency point is a lowest frequency of the first frequency band, a highest frequency of the first frequency band, or a center frequency of the first frequency band.

19. The apparatus of claim 11, wherein the lowest frequencies of the N frequency bands are distributed at an equal interval in a frequency domain.

20. A vehicle comprising:
an apparatus comprising:
a memory configured to store instructions; and
a processor coupled to the memory and configured to execute the instructions to cause the apparatus to be configured to:
determine a first frequency point of N frequency points, wherein N is a positive integer greater than 1; and
transmit a radio signal in a first frequency band of N frequency bands,
wherein the first frequency point is in the first frequency band, wherein a bandwidth of the first frequency band is a frequency sweep bandwidth of the radio signal,
wherein either:
one of the N frequency bands partially overlaps at least one of other N−1 frequency bands of the N frequency bands, and an absolute value of a difference between lowest frequencies of any two frequency bands of the N frequency bands is not less than a first threshold (F); or
the N frequency bands have at least one second frequency band that partially overlaps the first frequency band, and an absolute value of a difference between a lowest frequency of each of the at least one second frequency band and a lowest frequency of the first frequency band is not less than F,
wherein F is related to a maximum detection distance, a maximum interference tolerance distance, or a transmit timing moment error, and
wherein F is greater than a first frequency change range (F1) of the radio signal in a first time length (T1).

21. The vehicle of claim 20, further comprising at least one radar used by the processor of the apparatus to transmit the radio signal from the vehicle, wherein F is greater than or equal to a frequency change range of the radio signal in a first time length (T1), and wherein a value of T1 is based on a time delay (T2) associated with a distance between the at least one radar and a second radar.

* * * * *